(12) United States Patent
Enomoto et al.

(10) Patent No.: US 12,555,926 B2
(45) Date of Patent: Feb. 17, 2026

(54) ANTENNA SET

(71) Applicant: AGC Inc., Tokyo (JP)

(72) Inventors: Kotaro Enomoto, Tokyo (JP); Takeshi Motegi, Tokyo (JP); Mitsuru Wakatsuki, Tokyo (JP)

(73) Assignee: AGC Inc., Tokyo (JP)

( * ) Notice: Subject to any disclaimer, the term of this patent is extended or adjusted under 35 U.S.C. 154(b) by 348 days.

(21) Appl. No.: 18/193,770

(22) Filed: Mar. 31, 2023

(65) Prior Publication Data

US 2023/0246347 A1 Aug. 3, 2023

Related U.S. Application Data

(63) Continuation of application No. PCT/JP2021/040092, filed on Oct. 29, 2021.

(30) Foreign Application Priority Data

Nov. 9, 2020 (JP) .................. 2020-186500

(51) Int. Cl.
*H01Q 21/06* (2006.01)
*H01Q 1/12* (2006.01)
*H01Q 1/24* (2006.01)
*H01Q 3/02* (2006.01)
*H01Q 19/10* (2006.01)
*H01Q 21/08* (2006.01)
(Continued)

(52) U.S. Cl.
CPC ............. *H01Q 21/065* (2013.01); *H01Q 3/02* (2013.01); *H04B 7/0408* (2013.01)

(58) Field of Classification Search
None
See application file for complete search history.

(56) References Cited

U.S. PATENT DOCUMENTS

| | | | |
|---|---|---|---|
| 10,205,491 B2 * | 2/2019 | Molev Shteiman . | H04B 7/0413 |
| 2012/0020431 A1 * | 1/2012 | Tanabe .................. | H01Q 25/00 |
| | | | 343/893 |

(Continued)

FOREIGN PATENT DOCUMENTS

| | | | | |
|---|---|---|---|---|
| EP | 3416243 A1 * | 12/2018 | ........... | H01Q 21/205 |
| JP | 2017-38195 A | 2/2017 | | |

(Continued)

OTHER PUBLICATIONS

Kurita et al., Outdoor Experiments on 5G Radio Access Using Distributed MIMO and Beamforming in 28-GHz Frequency Band (Year: 2017).*

(Continued)

*Primary Examiner* — Mohammed Rachedine
(74) *Attorney, Agent, or Firm* — Oblon, McClelland, Maier & Neustadt, L.L.P.

(57) ABSTRACT

An antenna set includes an antenna unit group for transmitting streams in distributed-MIMO, wherein the antenna unit group includes a plurality of antenna units arranged apart from each other, and wherein the plurality of antenna units is installed at a height between 3 m and 8 m, inclusive, with a non-directional angle of a radiation pattern in a horizontal plane being more than or equal to 180°, and a radiation peak of a main lobe is inclined at a depression angle of greater than 0° and less than or equal to 15°.

9 Claims, 19 Drawing Sheets

(51) Int. Cl.
  *H01Q 21/20*    (2006.01)
  *H01Q 21/28*    (2006.01)
  *H04B 7/024*    (2017.01)
  *H04B 7/0408*   (2017.01)

(56) References Cited

U.S. PATENT DOCUMENTS

2013/0307742 A1* 11/2013 Hu .................. H01Q 9/265
                                                    343/852
2019/0028159 A1*  1/2019 Bisiules ............... H01Q 5/48

FOREIGN PATENT DOCUMENTS

| WO | WO 2017/135368 A1 | 8/2017 | |
|---|---|---|---|
| WO | WO 2019/018276 A1 | 1/2019 | |
| WO | WO-2019096802 A1 * | 5/2019 | ........... H04B 17/104 |
| WO | WO-2020201049 A1 * | 10/2020 | ........... H04L 5/0048 |
| WO | WO-2021054878 A1 * | 3/2021 | ............... H01Q 3/40 |

OTHER PUBLICATIONS

Kurita Daisuke et al: "Outdoor experiments on 5G radio access using distributed MIMO and beamforming in 28-GHz frequency band", 2017 IEEE 28th Annual International Symposium on Personal, Indoor, and Mobile Radio Communications (Pimrc), IEEE, Oct. 8, 2017, pp. 1-6, XP033321566, DOI: 10.1109/PIMRC.2017. 8292671 ISBN: 978-1-5386-3529-2 [retrieved on Feb. 14, 2018].
Muhammad Usman Sheikh et al: "Analysis of multipoint transmission at higher frequencies using 3-D ray tracing", International Journal of Communication Systems, Wiley, Chichester, GB, vol. 30, No. 13, Jan. 24, 2017, p. 1-10, XP071994298, ISSN: 1074-5351, DOI: 10.1002/DAC.3274.
Kishiyama et al., "Advanced radio access technology and field demonstration results for 5G systems", NTT Docomo Technical Journal, vol. 25, No. 1, Apr. 2017, pp. 16-29 (with Machine Generated English Translation).

* cited by examiner

FIG.8

| LABEL | INTERVAL [m] (=d) | HEIGHT [m] (=b) | TILT ANGLE [deg] (=a) | HALF-WIDTH [deg] (=c) | PERCENTAGE OF 1 Gbps OR MORE [%] | PERCENTAGE OF 2 Gbps OR MORE [%] | PERCENTAGE OF 3 Gbps OR MORE [%] |
|---|---|---|---|---|---|---|---|
| 1 | 20 | 3 | 5 | 9.7 | 96.3 | 87.2 | 48.4 |
| 2 | 20 | 3 | 10 | 4.9 | 93.5 | 46.4 | 17.2 |
| 3 | 20 | 5 | 5 | 9.7 | 96.5 | 87.1 | 43.8 |
| 4 | 20 | 5 | 10 | 4.9 | 89.3 | 49.6 | 23.0 |
| 5 | 20 | 7 | 5 | 9.7 | 96.1 | 84.4 | 23.4 |
| 6 | 20 | 7 | 10 | 9.7 | 95.9 | 78.2 | 31.2 |
| 7 | 20 | 7 | 10 | 4.9 | 86.6 | 57.1 | 20.3 |
| 8 | 20 | 10 | 10 | 9.7 | 95.7 | 77.4 | 14.9 |
| 9 | 40 | 5 | 5 | 15.1 | 95.9 | 82.1 | 28.4 |
| 10 | 40 | 5 | 5 | 9.7 | 96.4 | 90.3 | 47.0 |
| 11 | 40 | 5 | 10 | 9.7 | 95.9 | 81.6 | 37.9 |
| 12 | 40 | 7 | 5 | 9.7 | 96.0 | 86.6 | 28.8 |
| 13 | 40 | 7 | 10 | 15.1 | 95.6 | 77.6 | 21.9 |
| 14 | 60 | 5 | 5 | 9.7 | 97.2 | 90.9 | 41.8 |
| 15 | 60 | 5 | 10 | 15.1 | 96.6 | 82.9 | 20.1 |
| 16 | 20 | 3 | 20 | 9.7 | 65.4 | 15.6 | 6.3 |
| 17 | 20 | 5 | 20 | 9.7 | 58.1 | 23.2 | 9.2 |
| 18 | 20 | 7 | 20 | 9.7 | 59.4 | 31.5 | 11.5 |
| 19 | 20 | 10 | 20 | 9.7 | 69.3 | 42.8 | 10.4 |

ANTENNA SET

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2021/040092 filed on Oct. 29, 2021 and designating the U.S., which claims priority to Japanese Patent Application No. 2020-186500 filed on Nov. 9, 2020. The entire contents of the foregoing applications are incorporated herein by reference.

BACKGROUND OF THE INVENTION

1. Field of the Invention

The present disclosure relates to an antenna set.

2. Description of the Related Art

Conventionally, MIMO (Multiple Input Multiple Output) wireless communication using a plurality of antenna elements is known (see, for example, International Publication No. 2017-135368 and Japanese Laid-Open Patent Publication No. 2017-38195). Distributed-MIMO is also known as a technique for MIMO multiplexing transmission of different streams from a plurality of transmission locations (see, for example, NTT DOCOMO Technical Journal Vol. 25 No. 1 issued on April, 2017).

However, in the distributed-MIMO, a plurality of antenna units for transmitting streams is required to be installed at a certain distance from each other. Therefore, it is difficult to secure an installation place where a communication area capable of obtaining relatively high throughput can be formed.

SUMMARY OF THE INVENTION

The present disclosure provides an antenna set including an antenna unit group for transmitting streams in distributed-MIMO, wherein the antenna unit group includes a plurality of antenna units arranged apart from each other, and wherein the plurality of antenna units is installed at a height between 3 m and 8 m, inclusive, with a non-directional angle of a radiation pattern in a horizontal plane being more than or equal to 180°, and a radiation peak of a main lobe is inclined at a depression angle of greater than 0° and less than or equal to 15°.

BRIEF DESCRIPTION OF THE DRAWINGS

FIG. 8 is a list of throughput evaluation values measured when radio waves are transmitted and received in 3×3 MIMO;

DESCRIPTION OF THE PREFERRED EMBODIMENT

Figure 1:
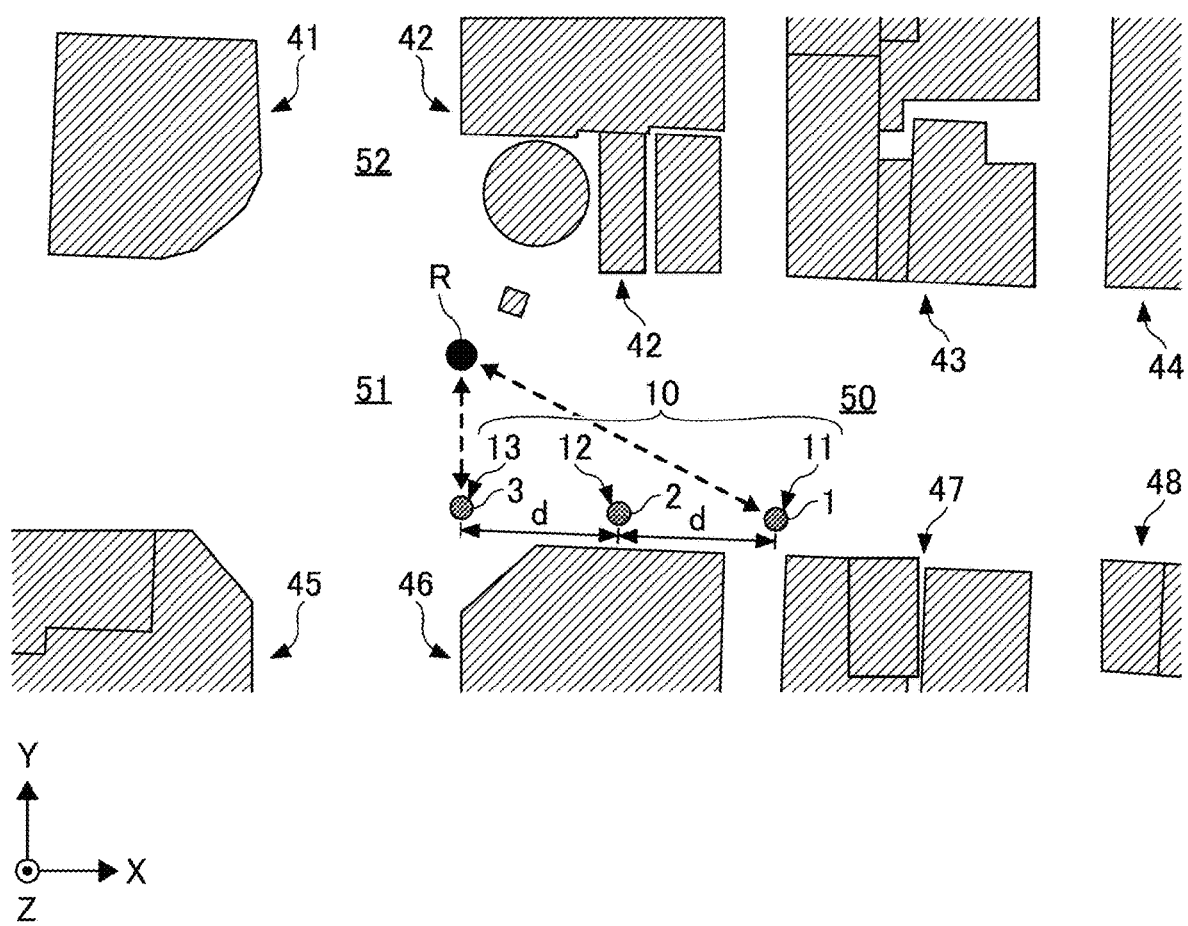
FIG. 1 is a diagram illustrating an arrangement example of an antenna set including an antenna unit group for transmitting streams in distributed-MIMO.

The present disclosure provides an antenna set capable of forming a communication area where relatively high throughput can be obtained.

According to the present disclosure, it is possible to provide an antenna set capable of forming a communication area where relatively high throughput can be obtained.

Hereinafter, an embodiment will be described with reference to the drawings. For ease of understanding, the scale of each part in the drawings may be different from the actual scale. In the present specification, a three-dimensional orthogonal coordinate system in three axis directions (X-axis direction, Y-axis direction, and Z-axis direction) is used.

The X-axis direction, the Y-axis direction, and the Z-axis direction represent a direction parallel to the X-axis, a direction parallel to the Y-axis, and a direction parallel to the Z-axis, respectively. The X-axis direction, the Y-axis direction, and the Z-axis direction are orthogonal to each other. The X-Y plane, the Y-Z plane, and the Z-X plane represent a virtual plane parallel to the X-axis direction and the Y-axis direction, a virtual plane parallel to the Y-axis direction and the Z-axis direction, and a virtual plane parallel to the Z-axis direction and the X-axis direction, respectively.

FIG. 1 is a diagram illustrating an arrangement example of an antenna set including an antenna unit group for transmitting streams in distributed-MIMO. The X-axis direction and the Y-axis direction are substantially parallel to the direction parallel to a horizontal plane (horizontal direction), and the Z-axis direction is substantially parallel to the vertical direction perpendicular to the horizontal plane. In FIG. 1, an antenna set 10 includes an antenna unit group including a plurality of antenna units arranged apart from each other, and three antenna units (a first antenna unit 11, a second antenna unit 12, and a third antenna unit 13) are illustrated. Hereinafter, the first antenna unit 11, the second antenna unit 12, and the third antenna unit 13 are also collectively referred to as antenna units 11, 12, and 13.

Each of the antenna units 11, 12, and 13 is a device that transmits and receives radio waves in a high-frequency band (for example, 0.3 GHz to 300 GHz) such as microwaves including millimeter waves. Each of the antenna units 11, 12, and 13 is formed to be capable of transmitting and receiving radio waves corresponding to, for example, a fifth generation mobile communication system (so-called 5G), a wireless communication standard such as Bluetooth®, or a wireless local area network (LAN) standard such as IEEE802.11ac. Note that the antenna units 11, 12, and 13 may be formed to be able to transmit and receive electromagnetic waves corresponding to standards other than these mentioned above, or may be formed to be able to transmit and receive electromagnetic waves of a plurality of different frequencies. Each of the antenna units 11, 12, and 13 or the antenna set 10 including the antenna units 11, 12, and 13 can be used as, for example, a radio base station.

The antenna set 10 includes an antenna unit group (in this example, the antenna units 11, 12, and 13) for transmitting streams in distributed-MIMO. In the distributed-MIMO, a plurality of antenna units for transmitting streams is required to be installed at a certain distance from each other. Therefore, it is difficult to secure an installation place capable of forming a communication area (also referred to as a "coverage area") where relatively high throughput can be obtained. Since radio waves in a high-frequency band such as microwaves (millimeter waves, particularly) are difficult to propagate far, and have strong straightness, it is not easy to design the communication area, and there is a possibility that many wireless base stations are required.

In the antenna set 10 illustrated in FIG. 1, each of the antenna units 11, 12, and 13 arranged apart from each other is installed at the height between 3 m and 8 m, inclusive, from the ground in the Z-axis direction, and the radiation peak of the main lobe is inclined at the depression angle of greater than 0° and less than or equal to 15°. As a result, the antenna set 10 can transmit a beam toward the ground from each of the antenna units 11, 12, and 13 installed at a relatively high place, and thus can form a communication area where relatively high throughput can be obtained between the antenna set 10 and the ground. The depression angle of the radiation peak of the main lobe is preferably an angle in a vertical plane perpendicular to the horizontal plane and perpendicular to the direction in which the antenna units 11, 12, and 13 are arrayed.

When the height at which the antenna unit is installed is higher than or equal to 3 m, the antenna unit is more distant from the ground than when the height is less than 3 m, so that it is easy to horizontally expand a communication area where relatively high throughput can be obtained. When the height at which the antenna unit is installed is equal to or lower than 8 m, the antenna unit is closer to the ground than when the height is greater than 8 m, so that a relatively high gain can be secured even at a place where the height from the ground is relatively low. Therefore, it becomes easy to expand a communication area where relatively high throughput can be obtained.

The plurality of antenna units is more preferably installed at between 3.5 m and 7.5 m, inclusive, from the view point of forming a communication area between the units and the ground where relatively high throughput can be obtained.

The height at which the antenna units are installed is defined as a height from one reference plane (for example, the ground, the floor, or a virtual plane) parallel to a horizontal plane. For example, when an antenna unit that radiates radio waves outdoors is installed outdoors as shown in FIG. 1, the installation height of the antenna unit is defined as the height from the outdoor ground. For another example, when an antenna unit that radiates radio waves indoors is installed indoors, the installation height of the antenna unit is defined as the height from the indoor floor surface.

When the radiation peak of the main lobe is inclined at a depression angle greater than 0°, the main lobe is closer to the ground than when the radiation peak of the main lobe is inclined at an elevation angle. Therefore, since a relatively high gain can be secured even at a place where the height from the ground is relatively low, it becomes easy to expand a communication area where relatively high throughput can be obtained. Whereas, when the radiation peak of the main lobe is inclined at the depression angle of 15° or less, the range in which the main lobe reaches the ground is more distant from the installation point of the antenna unit than when the radiation peak of the main lobe is inclined at the depression angle exceeding 15°. It becomes easy therefore to expand a communication area where relatively high throughput can be obtained in the horizontal direction.

The radiation peak of the main lobe is more preferably inclined at the depression angle between 1.0° and 14°, inclusive, from the view point of forming a communication area between the units and the ground where relatively high throughput can be obtained.

In the example shown in FIG. 1, the antenna units 11, 12, and 13 are arranged apart from each other in the horizontal direction. Thereby, the antenna set 10 can easily expand a communication area where relatively high throughput can be obtained in the horizontal direction. One configuration in which the antenna units 11, 12, and 13 are arranged apart from each other in the horizontal direction is, for example, a configuration in which all the antenna units 11, 12, and 13 are arranged to intersect with one virtual plane parallel to the horizontal plane.

For example, when the antenna units 11, 12, and 13 are arranged at the same height, it makes easy to overlap a communication area formed by the beam transmitted from the first antenna unit 11 toward the ground, a communication area formed by the beam transmitted from the second antenna unit 12 toward the ground, and a communication area formed by the beam transmitted from the third antenna unit 13 toward the ground. Thereby, the antenna set 10 can form a communication area where relatively high throughput can be obtained. One configuration in which the antenna units 11, 12, and 13 are arranged at the same height is, for example, a configuration in which distances (heights) from one reference plane parallel to a horizontal plane to centers (centers of gravity) of antenna openings of antenna units 11, 12, and 13 are equal.

Among the antenna units 11, 12, and 13, at least one unit may be disposed at a height different from that of at least one of the remaining units. One configuration in which at least one unit is disposed at a height different from that of at least one of the remaining units is, for example, a configuration in which the distance (height) from one reference plane parallel to the horizontal plane to the center (centers of gravity) of the antenna opening is different between at least one unit and at least one of the remaining units.

In the example illustrated in FIG. 1, the antenna units 11, 12, and 13 are installed on structures such as columnar poles 1, 2, and 3, respectively, apart from each other. By installing the antenna units 11, 12, and 13 in a plurality of structures installed apart from each other, it becomes easy to arrange the antenna units 11, 12, and 13 at intervals required for distributed-MIMO.

However, if the interval required for distributed-MIMO is secured, at least one of the antenna units 11, 12, and 13 may be installed in the same structure in which at least one of the remaining antenna units is installed. This makes it possible to install at least one unit and at least one of the remaining antenna units on a common structure, thereby facilitating the installation work of the antenna units.

For example, wiring (not illustrated) is connected to each of the antenna units 11, 12, and 13. Specific examples of the wiring include coaxial cables and optical cables. The antenna units 11, 12, and 13 are connected to a common baseband unit (not shown) via corresponding wires. The baseband unit is a device that performs communication control for implementing distributed-MIMO. The baseband unit may be installed in a structure in which any one of the antenna units 11, 12, and 13 is installed, or may be installed in a place such as a building, the ground, or a floor.

In the example shown in FIG. 1, the antenna units 11, 12, and 13 are arranged parallel to each other. This makes it easy to overlap the communication area formed by the beam transmitted from the first antenna unit 11 toward the ground, the communication area formed by the beam transmitted from the second antenna unit 12 toward the ground, and the communication area formed by the beam transmitted from the third antenna unit 13 toward the ground. The antenna set 10 thereby can form a communication area where relatively high throughput can be obtained. In the example shown in FIG. 1, since the antenna units 11, 12, and 13 are arranged along the common Z-X plane (in this example, one virtual plane perpendicular to the horizontal plane), it is possible to more easily form a communication area where relatively high throughput can be obtained.

An interval d between the plurality of antenna units is, for example, between 10 m and 80 m, inclusive, to ensure the throughput and suppress an increase in the range of installation of the plurality of antenna units. When the interval d is equal to or greater than 10 m, a communication area where relatively high throughput can be obtained can be easily expanded in the direction of the interval d, as compared with the case where the interval d is less than 10 m. When the distance d is equal to or less than 80 m, the installation area of the plurality of antenna units can be reduced as compared with the case where the distance d exceeds 80 m. When the distance d is equal to or less than 80 m, the overlapping area of the communication areas formed by the plurality of antenna units is larger than that in the case where the distance d exceeds 80 m, and thus it is easy to form a communication area where relatively high throughput can be obtained. The distance d is more preferably between 20 m and 70 m, inclusive, to achieve both ensuring of throughput and suppression of widening of installation area for the plurality of antenna units.

Further, the antenna set 10 may include reflectors that reflect radio waves between adjacent antenna units included in the plurality of antenna units. With the reflector, a communication area where relatively high throughput can be obtained can be more easily formed. The reflector reflects a radio wave in a direction of the communication area formed by the adjacent antenna units.

FIG. 1 is a top view (plan view) schematically illustrating an example of a positional relationship between the antenna set and a building group as viewed from above. Buildings 41, 42, 43, 44, 45, 46, 47, and 48 are built along a road 50. The buildings 41, 42, 43, and 44 face the buildings 45, 46, 47, and 48, respectively, across the road 50. An intersection 51 is a place where the road 50 extending in the X-axis direction and a road 52 extending in the Y-axis direction intersect with each other. The antenna units 11, 12, and 13 are installed in the poles 1, 2, and 3 arranged in the X-axis direction along the road 50, respectively.

In the antenna units 11, 12, and 13, the non-directional angle of the radiation pattern on the horizontal plane (the horizontal plane at the installation height of the antenna units 11, 12, and 13) is more than or equal to 180°. As a result, even if one or more obstacles that obstruct propagation of radio waves are present around the antenna units 11, 12, and 13, the antenna set 10 can form a communication area where relatively high throughput can be obtained between the units and the ground. The obstacle (shield) that interferes with propagation of radio waves is, for example, a concrete structure such as a building.

Figure 2:
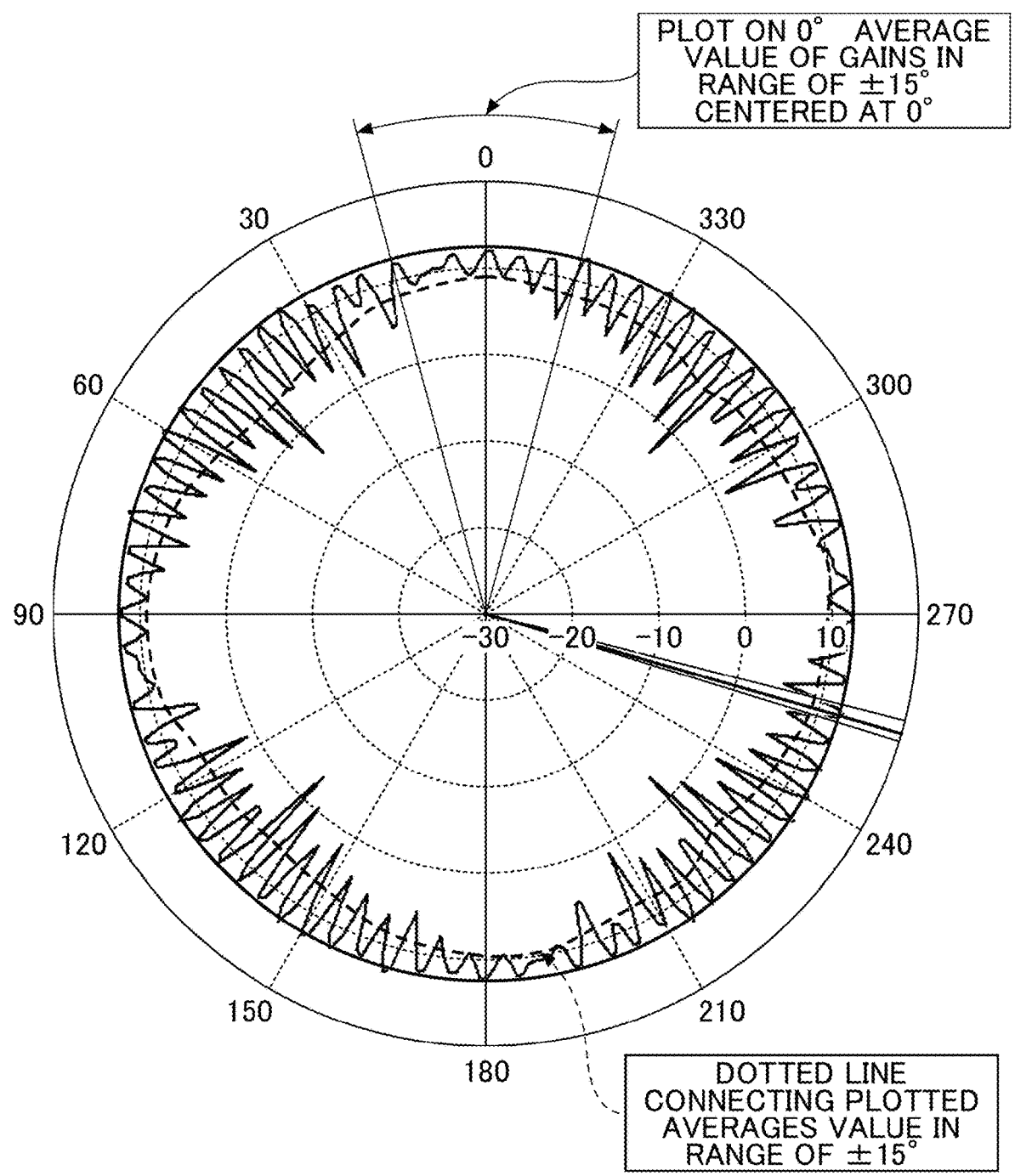
FIG. 2 is a diagram illustrating an example of a 360° non-directional radiation pattern radiated from one antenna unit.

FIG. 2 is a diagram illustrating an example of a radiation pattern in which a non-directional angle radiated from one antenna unit is 360°. The non-directional angle of the radiation pattern on the horizontal plane refers to an angle range in which the deviation of the arithmetic mean value of gains at respective angles included in a range of ±15° around each angle on the horizontal plane is 6 dB or less. For example, an arithmetic mean value of gains at 31 angles included in a range of ±15° centered at 0° (345° to 15°) is plotted on 0°, and an arithmetic mean value of gains at 31 angles included in a range of ±15° centered at 1° (346° to) 16° is plotted on 1°. Among the plotted 360 values, a continuous angle range in which the deviation is equal to or less than 6 dB is then set as a non-directional angle. When there is a plurality of such ranges, the non-directional angle is set to the maximum angle range. When the deviation is equal to or less than 6 dB over the entire circumference (all the 360 points), it is also referred to as "the directivity of the radiation pattern on the horizontal plane is 360° omnidirectional".

When each of the antenna units 11, 12, and 13 has a half-width (also referred to as a "half-angle") of the main lobe in which the radiation peak is inclined at the above-described depression angle of between 6° and 15°, inclusive, the antenna set 10 can form a communication area where relatively high throughput can be obtained between the antenna units and the ground. This point will be described with reference to FIGS. 1, 3, 4, and 5. The half-width of the main lobe is an opening angle at a portion where the gain is 3 dB lower than that of the radiation peak of the main lobe (portion where the gain is the largest). The half-width of the main lobe at which the radiation peak is inclined at the above-described depression angle is preferably an angle of the main lobe in a vertical plane perpendicular to the horizontal plane and perpendicular to the direction in which the antenna units 11, 12, and 13 are arranged.

Figure 3:
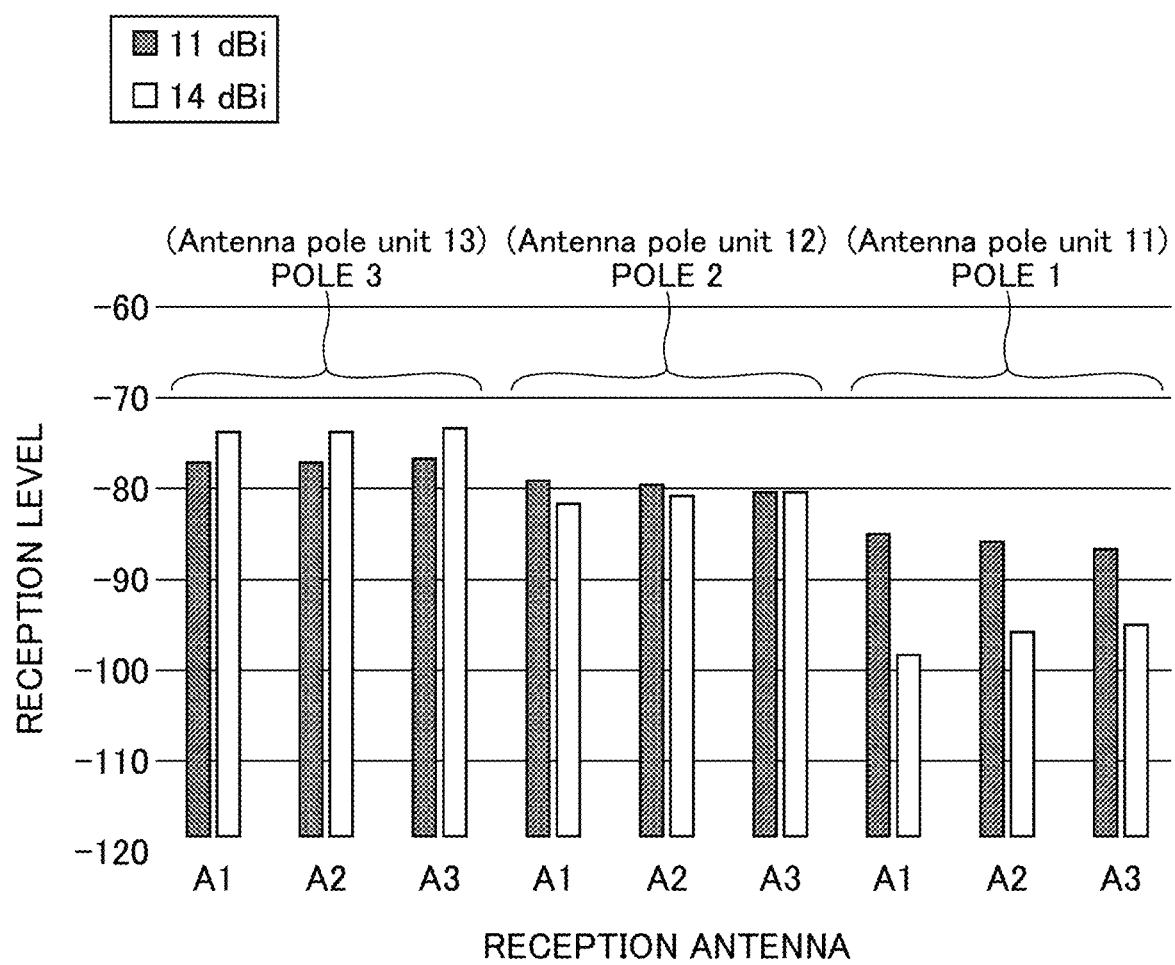
FIG. 3 is a graph illustrating an example of a result measuring reception levels at three reception antennas A1, A2, and A3 at a reception point R in a case where a radio wave is transmitted from one antenna unit among three antenna units each having a different distance from the reception point R.

FIG. 3 is a graph illustrating an example of a result obtained by measuring reception levels at three reception antennas A1, A2, and A3 at a reception point R in a case where a radio wave is transmitted from one antenna unit among the three antenna units 11, 12, and 13 having different distances from the reception point R. FIG. 3 shows two types of cases where the gain of the radiation peak of the main lobe is 14 dBi and 11 dBi. The gain 11 dBi corresponds to the half-width of 10°, and the gain 14 dBi corresponds to the half-width of 5°. The reception level on the vertical axis corresponds to "reception power÷transmission power". The reception point R is located at a position where the direct wave of the main lobe radiated from the third antenna unit 13 arrives, and the third antenna unit 13 is the closest to the reception point R among the three antenna units 11, 12, and 13 (see FIG. 1).

In the case of the third antenna unit 13 closest to the reception point R, since the direct wave of the main lobe reaches the reception point R, as shown in FIG. 3, the reception level at the reception point R is higher at the gain 14 dBi than at the gain 11 dBi. On the other hand, in the case of the first antenna unit 11 and the second antenna unit 12 which are far from the reception point R, as shown in FIG. 3, the reception level at the reception point R is higher at the gain 11 dBi than at the gain 14 dBi. This is because the half-width of the main lobe is larger in the gain 11 dBi than in the gain 14 dBi, and thus the number of reflected waves reaching the reception point R increases.

Figure 4:
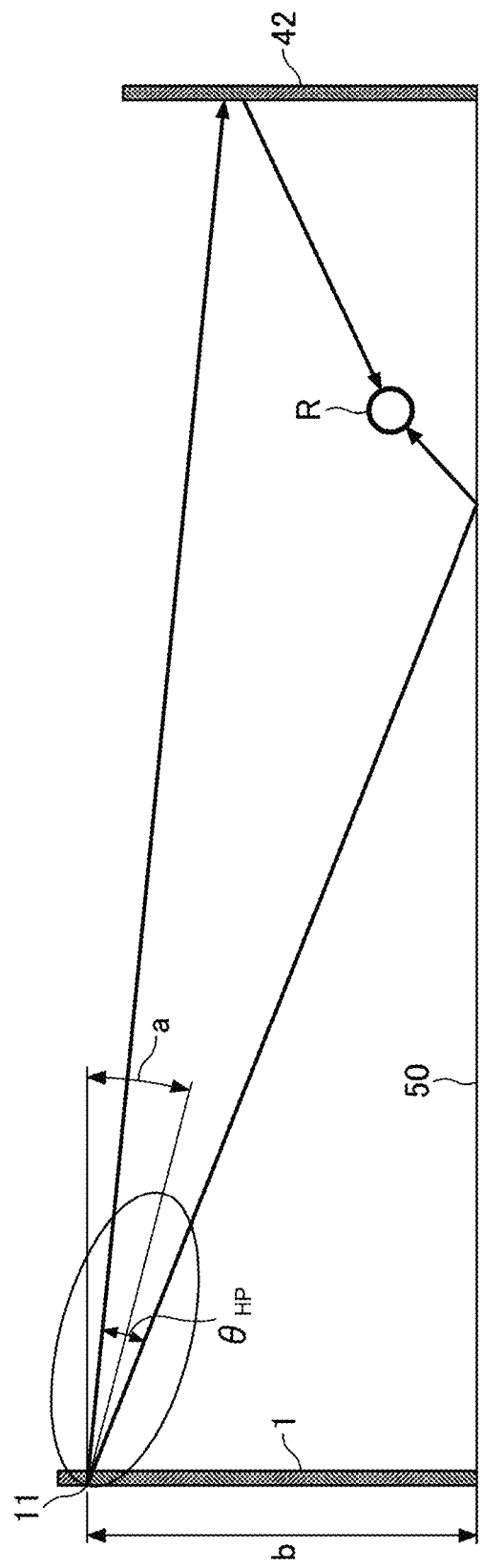
FIG. 4 is a diagram illustrating an example of a case where a radio wave is received at the reception point R when a radiation peak gain of a main lobe is relatively low.
Figure 5:
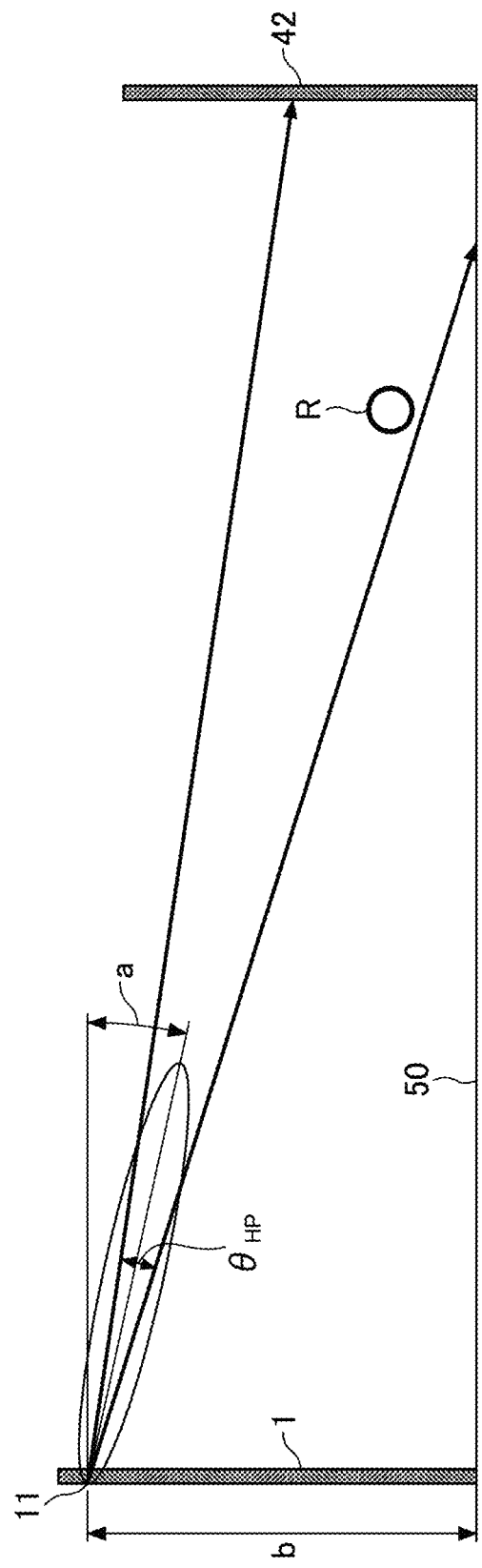
FIG. 5 is a diagram illustrating an example of a case where a radio wave is received at the reception point R when the radiation peak gain of the main lobe is relatively high.

FIG. 4 is a diagram illustrating an example of a case where a radio wave is received at the reception point R when the gain of the radiation peak of the main lobe is relatively low. FIG. 5 is a diagram illustrating an example of a case where a radio wave is received at the reception point R when the gain of the radiation peak of the main lobe is relatively high. In the case of FIG. 4 where the gain of the radiation peak is low, a half-width $\theta_{HP}$ of the main lobe is large and the directivity of the main lobe becomes low. Therefore, since the degree of arrival of the radio wave reflected by the obstacle such as the building 42 at the reception point R is increased, the degree of arrival of the incoming wave having a relatively high gain at the reception point R is increased. On the other hand, in the case of FIG. 5 where the gain of the radiation peak is high, the half-width $\theta_{HP}$ of the main lobe is small and the directivity of the main lobe is high. Therefore, since the degree of arrival of the radio wave reflected by the obstacle such as the building 42 at the reception point R is reduced, the degree of arrival of the incoming wave having a relatively high gain at the reception point R is reduced.

Therefore, when the half-width $\theta_{HP}$ of the main lobe of each of the antenna units 11, 12, and 13 is more than or equal to 6°, the degree of arrival of an incoming wave having a relatively high gain at the reception point R is greater than that when $\theta_{HP}$ is less than 6°. That is, when the half-width $\theta_{HP}$ is more than or equal to 6°, the antenna set 10 can form a communication area where relatively high throughput can be obtained between the antenna set and the ground. On the other hand, in the antenna units 11, 12, and 13, when the half-width $\theta_{HP}$ of the main lobe is 15° or less, the reflected wave reaching the reception point R is reduced as compared with the case where the half-width $\theta_{HP}$ exceeds 15°, but the degree of the direct wave having a relatively high gain reaching the reception point R is increased. That is, when the half-width $\theta_{HP}$ is 15° or less, the antenna set 10 can form a communication area where relatively high throughput can be obtained between the antenna set and the ground.

As defined that the reception point R is a point at which a direct wave reception level of a radio wave transmitted from one antenna unit included in the antenna unit group is maximized, a reception level Lp is defined as "a reflected wave reception level of the radio wave [dB]÷the direct wave reception level of the radio wave [dB]", at the reception point R. The level at which the reflected wave of the radio wave is received at the reception point R corresponds to "reception power of the reflected wave at the reception point R÷transmission power of the radio wave", and the level at which the direct wave of the radio wave is received at the reception point R corresponds to "reception power of the direct wave at the reception point R÷transmission power of the radio wave". At this time, if the reception level Lp is between 0.7 and 0.95, inclusive, preferably between 0.75 and 0.99, inclusive, a communication area where relatively high throughput can be obtained can be formed between the antenna units and the ground.

Figure 6:
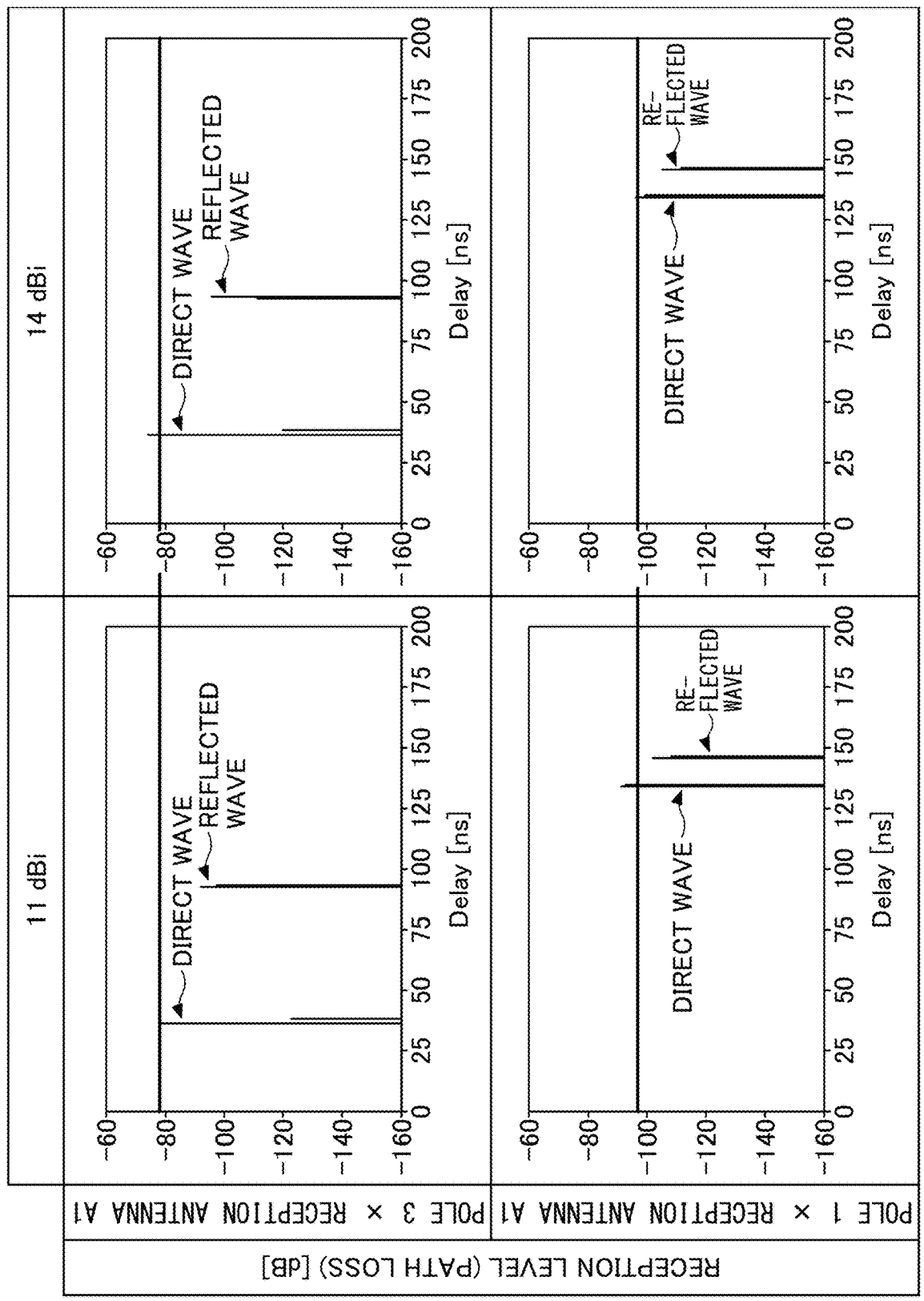
FIG. 6 is a diagram illustrating an example of delay profiles of a direct wave and a reflected wave received by the reception antenna located at the reception point R.

FIG. 6 is a diagram illustrating an example of delay profiles of a direct wave and a reflected wave received by the reception antenna A1 located at the reception point R. FIG. 6 shows a case where a radio wave is transmitted from the third antenna unit 13 installed in the pole 3 closest to the reception point R, and a case where a radio wave is transmitted from the first antenna unit 11 installed in the pole 1 farthest from the reception point R. A case of 11 dBi in which the reception level Lp is between 0.7 and 0.95, inclusive, can form, as compared with a case of 14 dBi in which the reception level Lp is not between 0.7 and 0.95, inclusive, a communication area where relatively high throughput can be obtained between the antenna units and the ground.

Figure 7:
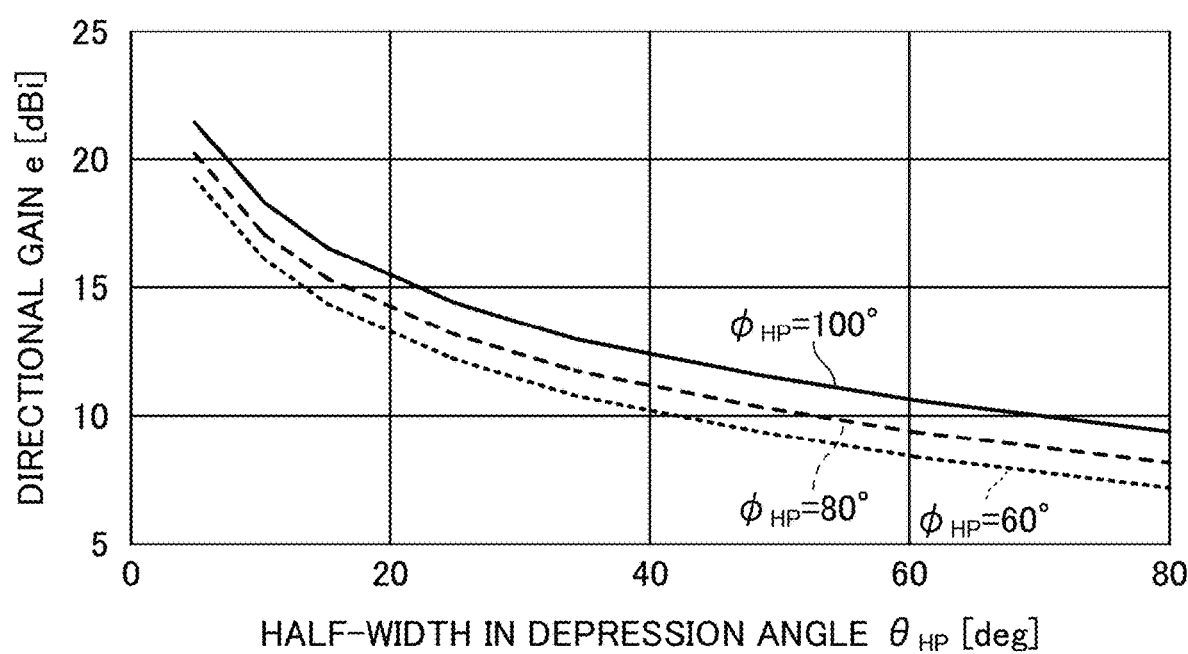
FIG. 7 is a diagram illustrating an example of a relationship between a half-width of a main lobe in a vertical plane and the radiation peak gain of the main lobe.
Figure 13:
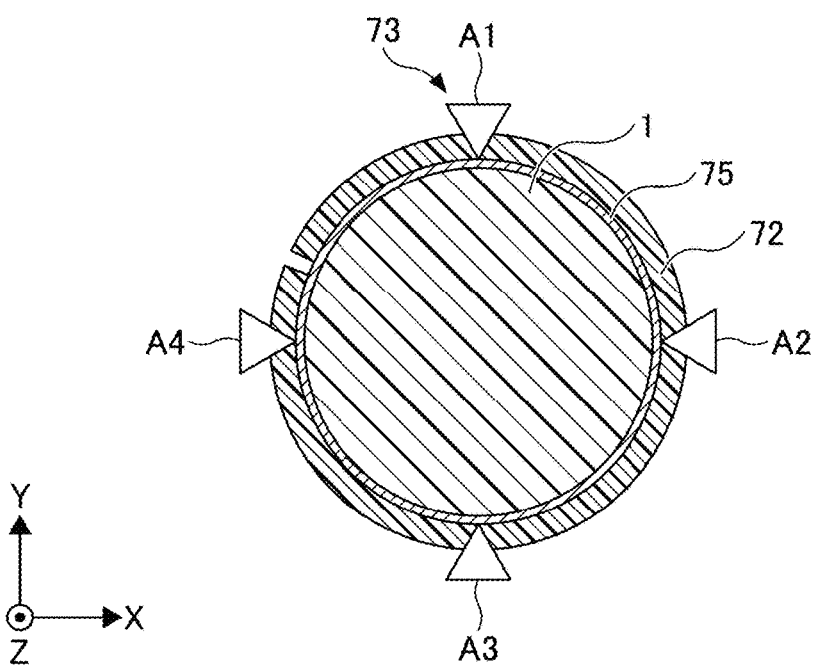
FIG. 13 is a cross-sectional view illustrating an example of the antenna unit installed on the outer peripheral surface of a pole.

FIG. 7 is a diagram showing an example of the relationship between the half-width $\theta_{HP}$ of the main lobe in the vertical plane perpendicular to the horizontal plane and a directional gain e of the radiation peak of the main lobe, when a half-width $\Phi_{HP}$ of the main lobe in the horizontal plane of each of the antennas A1, A2, A3, and A4 in FIG. 13 is 100°, 80°, and 60°, respectively. The directional gain e [dBi] satisfies the equation below. The graph shown in FIG. 7 represents the data obtained by this equation.

$$e=10\times\log_{10}(41253/(\Phi_{HP}\times\theta_{HP}))$$

The half-width $\Phi_{HP}$ of the main lobe in the horizontal plane is not limited to 100°, 80°, or 60°, and may be larger or smaller than these. The antennas A1, A2, A3, and A4 are preferably designed to have the directional gain close to the gain e [dBi] shown in FIG. 7. The configuration of the antennas A1, A2, A3, and A4 will be described in detail later.

According to FIG. 7, the antennas A1, A2, A3, and A4 are preferably designed to have the gain e close to 14 dBi to 21 dBi when the half-width $\theta_{HP}$ of the main lobe in the vertical plane perpendicular to the horizontal plane is between 6° and 15°, inclusive, in each case where the half-width $\Phi_{HP}$ of the main lobe in the horizontal plane is 100°, 80°, and 60°. Thus, the gain of one antenna unit can be increased, and the antenna set 10 can then form a communication area where relatively high throughput can be obtained between the antenna set and the ground.

FIG. 8 is a list of evaluation values of throughput measured when radio waves are transmitted and received in 3×3 MIMO in an area of 60 m×200 m including installation points of the three antenna units 11, 12, and 13 shown in FIG. 1. The throughput is evaluated by a value measured in a case where reception points (one receiving terminal is assumed) are arranged in a 1 m mesh in the area and streams transmitted from the three antenna units 11, 12, and 13 are received by three reception antennas located at the respective reception points.

FIG. 8 shows evaluation values of throughput measured under 19 different conditions in which a depression angle a (tilt angle), a height b, a half-width c, and the interval d are changed. The depression angles a represents an average value of the depression angles of the plurality of antenna units. The height b represents an average value of installation heights of the plurality of antenna units. The half-width c represents an average value of the half-width $\theta_{HP}$ of the main lobe radiated from each of the plurality of antenna units. The interval d represents an average value of intervals between adjacent antenna units included in the plurality of antenna units.

The "percentage of more than or equal to 1 Gbps" represents a percentage (cumulative probability) of reception points at which throughput of more than or equal to 1 Gbps is measured among all reception points arranged in the 1 m mesh in 60 m×200 m area. The "percentage of more than or equal to 2 Gbps" represents a percentage (cumulative probability) of reception points at which throughput of more than or equal to 2 Gbps is measured among all reception points arranged in the 1 m mesh in 60 m×200 m area. The "percentage of more than or equal to 3 Gbps" represents a percentage (cumulative probability) of reception points at which throughput of more than or equal to 3 Gbps is measured among all reception points arranged in the 1 m mesh in 60 m×200 m area.

When a principal component analysis is performed using four explanatory variables of the depression angle a (tilt angle), the height b, the half-width c, and the interval d by using the measurement data group including 19 pieces of data shown in FIG. 8, a first principal component PC1 and a second principal component PC2 are obtained by the following equations:

$$PC1=-(a/10.6)-(b/10.8)+(c/5.7)+(d/19.8)-1.8$$

$$PC2=(a/12.0)+(b/2.5)+(c/6.6)+(d/99.6)-4.9$$

Figure 9:
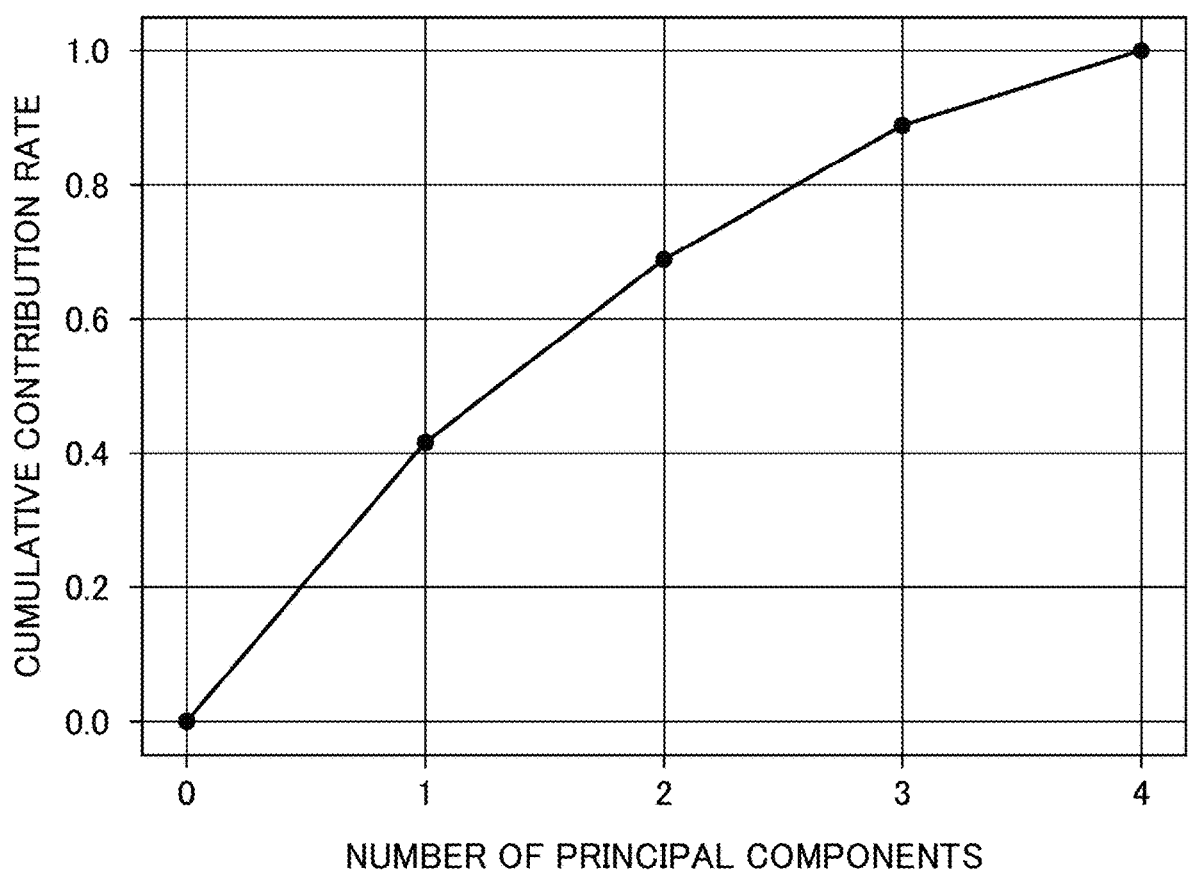
FIG. 9 is a diagram illustrating a cumulative contribution rate in a principal component analysis.

The cumulative contribution rate of the first principal component PC1 and the second principal component PC2 is 69.1% (see FIG. 9).

Figure 10:
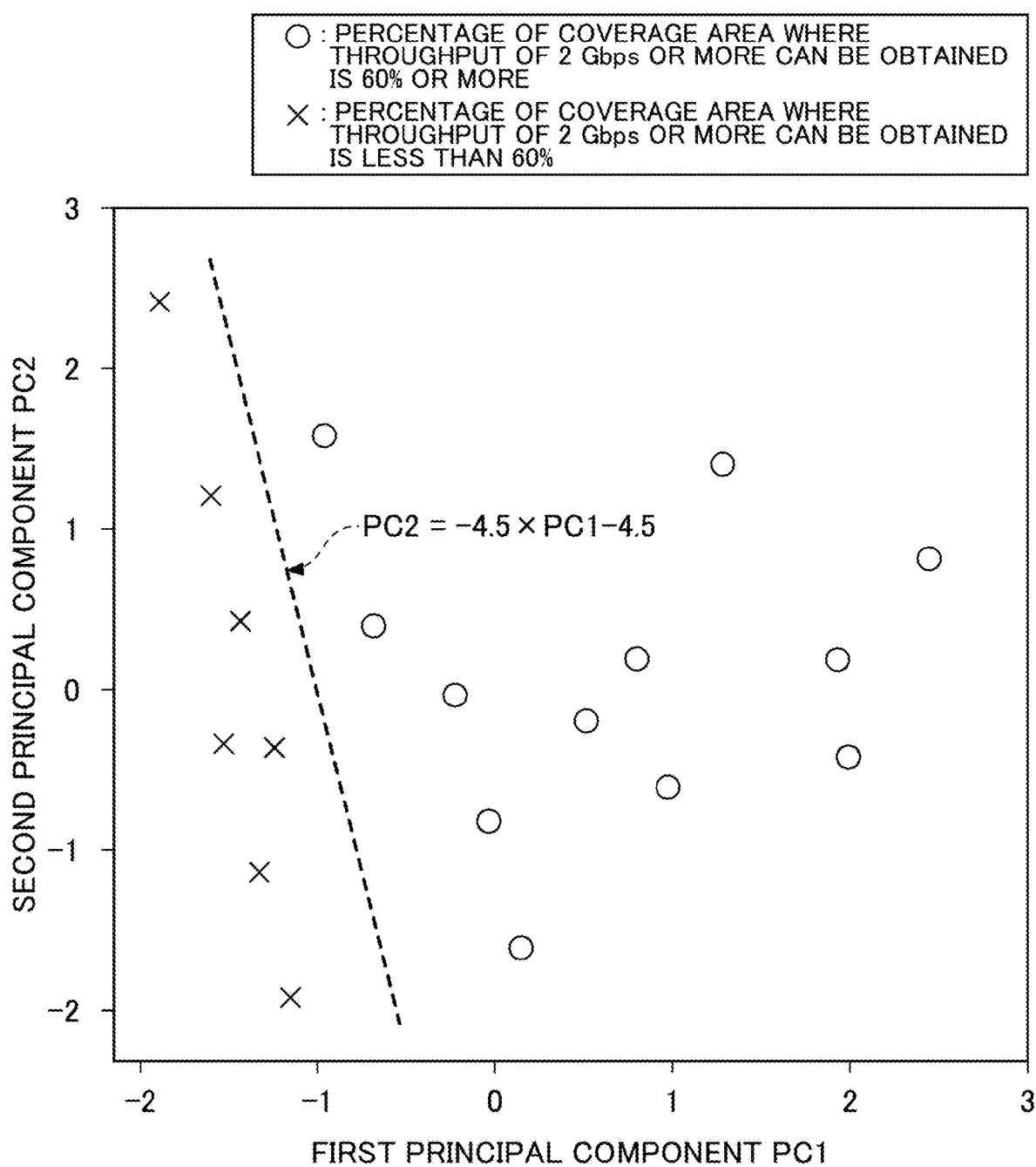
FIG. 10 is a scatter diagram of principal component scores obtained by assigning 19 types of individual values to a first principal component PC1 and a second principal component PC2.

FIG. 10 is a scatter diagram of principal component scores obtained by substituting the 19 types of individual datasets into the first principal component PC1 and the second principal component PC2. In FIG. 10, a symbol "○" represents a principal component score at which the percentage of reception points at which throughput of more than or equal to 2 Gbps is measured is more than or equal to 60% among all reception points arranged in the 1 m mesh in 60 m×200 m area, and a symbol "x" represents a principal component score at which the percentage is less than 60%. "PC2=−4.5×PC1−4.5" corresponds to a first boundary (first threshold) between the region marked with "○" and the region marked with "x".

According to FIG. 10, it is preferable to arrange the plurality of antenna units in such a manner that four values of the depression angle a (tilt angle), the height b, the half-width c, and the interval d satisfy "PC2≥−4.5×PC1−4.5". With this arrangement, the percentage of the coverage area where throughput of more than or equal to 2 Gbps can be obtained in the 60 m×200 m area can be more than or equal to 60%. That is, the antenna set 10 can form a communication area where relatively high throughput can be obtained between the antenna set and the ground.

Figure 11:
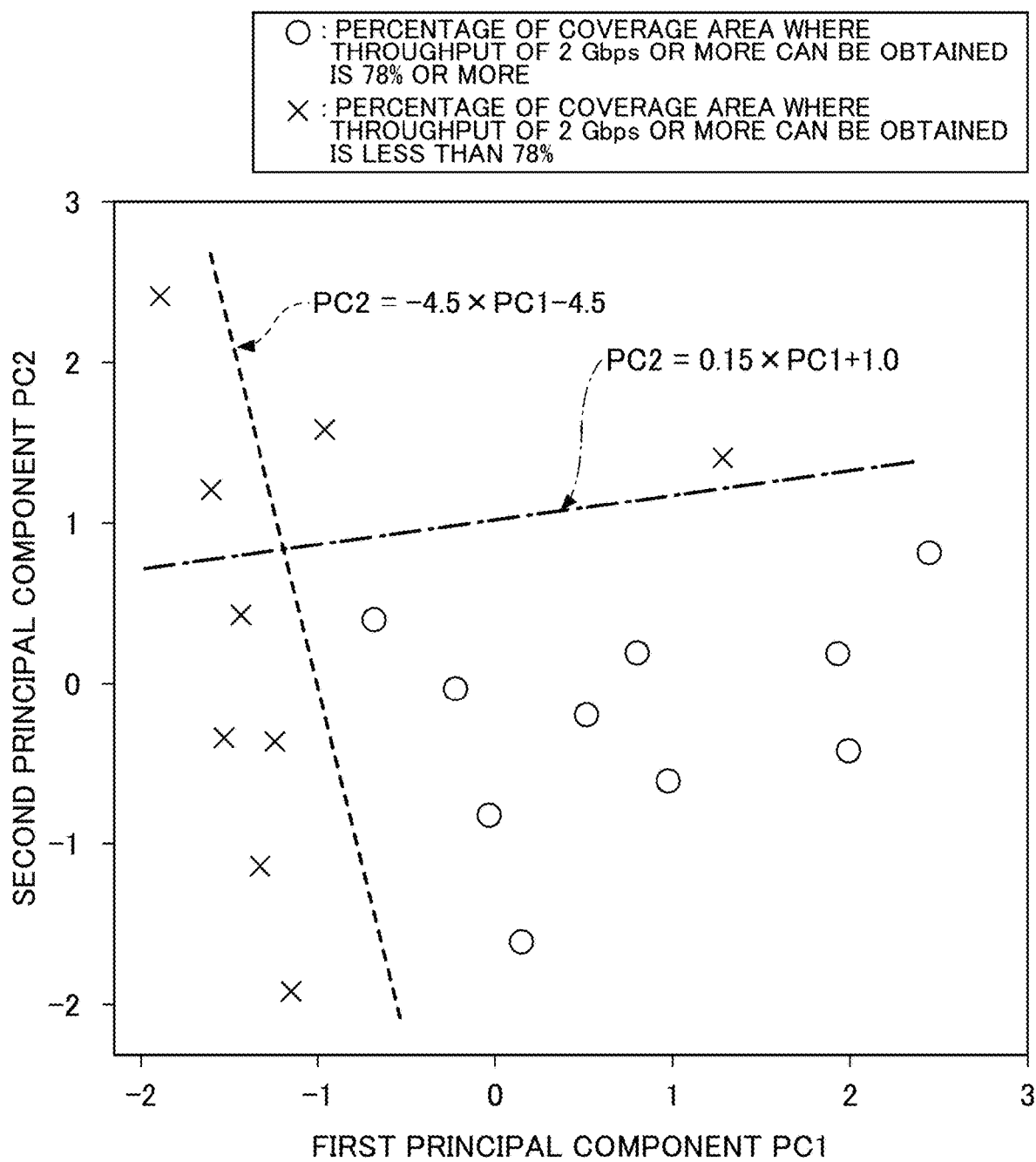
FIG. 11 is a scatter diagram of principal component scores obtained by assigning 19 types of individual values to the first principal component PC1 and the second principal component PC2.

FIG. 11 is a scatter diagram of principal component scores obtained by substituting the 19 types of individual datasets into the first principal component PC1 and the second principal component PC2. In FIG. 11, a symbol "○" represents a principal component score at which the percentage of reception points at which throughput of more than or equal to 2 Gbps is measured is more than or equal to 78% among all reception points arranged in the 1 m mesh in 60 m×200 m area, and a symbol "x" represents a principal component score at which the percentage is less than 78%. "PC2=0.15×PC1±1.0" corresponds to a second boundary (second threshold) between the region marked with "○" and the region marked with "x".

According to FIG. 11, it is preferable to arrange the plurality of antenna units in such a manner that four values of the depression angle a (tilt angle), the height b, the half-width c, and the interval d satisfy "PC2≥−4.5×PC1−4.5 and PC2≤0.15×PC1 +1.0". With this arrangement, the percentage of the coverage area where throughput of more than or equal to 2 Gbps can be obtained in the 60 m×200 m area can be more than or equal to 78%. That is, the antenna set 10 can form a communication area where relatively high throughput can be obtained between the antenna set and the ground.

Figure 12:
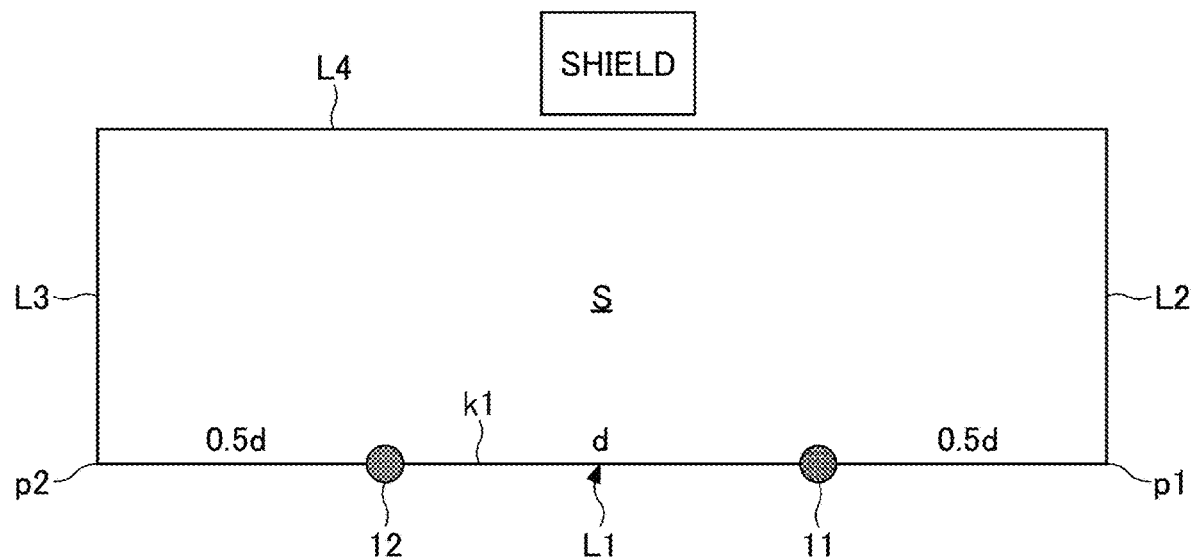
FIG. 12 is a plan view schematically illustrating a rectangular area formed around two adjacent antenna units.

FIG. 12 is a diagram schematically illustrating a rectangular area formed around two adjacent antenna units in a plan view. When viewed in a direction perpendicular to the horizontal plane, the length of a line segment k1 connecting the first antenna unit 11 and the second antenna unit 12 is d, a point extending the line segment k1 from the first antenna unit 11 by 0.5×d is p1, a point extending the line segment k1 from the second antenna unit 12 by 0.5×d is p2, a straight line passing the point p1 and the point p2 is L1, a straight line passing the point p1 and perpendicular to the line L1 is L2, a straight line passing the point p2 and perpendicular to the line L1 is L3, a straight line parallel to the straight line L1 and farthest therefrom within a range not intersecting with an obstacle (shield) preventing propagation of radio waves is L4, and a rectangular area surrounded by the straight lines L1, L2, L3, and L4 is S. At this time, it is preferable that the first antenna unit 11 and the second antenna unit 12 are arranged in such a manner that the percentage of the area where throughput of greater than or equal to 1 Gbps can be obtained in the rectangular area S is greater than or equal to 90%. In FIG. 8 described above, the conditions that the percentage of the area where throughput of more than or equal to 1 Gbps can be obtained in the rectangular area S is greater than or equal to 90% is shown.

The lengths of the straight lines L2 and L3 may be fixed values within a range not intersecting with an obstacle (shield) preventing propagation of radio waves. For example, d, 1.5×d, 2×d, or the like may be adopted.

FIG. 13 is a cross-sectional view illustrating an example of an antenna unit installed on an outer circumferential surface of a pole. The antenna unit has a plurality of radiating elements 73. In FIG. 13, four antennas A1, A2, A3, and A4 are illustrated as the plurality of radiating elements 73. The plurality of radiating elements 73 is provided on a dielectric flexible base material 72 having a conductor 75 on a back surface thereof.

In FIG. 13, four radiating elements 73 are arranged at intervals of 90° on the outer circumferential surface of the pole, however, the number of radiating elements 73 may be less than four. For example, three radiating elements 73 may be arranged at intervals of 120°, or two radiating elements 73 may be arranged at intervals of 180°. Further, the number of the radiating elements 73 may be more than four. For example, six radiating elements 73 may be arranged at intervals of 60° or eight radiating elements 73 may be arranged at intervals of 45°.

In FIG. 13, the radiating element 73 is an antenna conductor formed to be capable of transmitting and receiving radio waves in a desired frequency band. Examples of the desired frequency band include an ultra high frequency (UHF) band having frequencies of 0.3 to 3 GHz, a super high frequency (SHF) band having frequencies of 3 to 30 GHz, and an extremely high frequency (EHF) band having frequencies of 30 to 300 GHz. The radiating element 73 functions as a radiator.

The radiating element 73 is provided over the first main surface on the outer side of the base material 72. The radiating element 73 may be formed by printing a metal material on a ceramic layer provided on the first main surface of the base material 72 to at least partially overlap the ceramic layer. As a result, the radiating element 73 is provided partially over the first main surface of the base material 72 to extend over the portion where the ceramic layer is formed and the portion where the ceramic layer is not formed.

The radiating element 73 is, for example, a conductor formed in a planar shape. As the metal material forming the radiating element 73, a conductive material such as gold, silver, copper, aluminum, chromium, lead, zinc, nickel, or platinum can be used. The conductive material may be an alloy, such as an alloy of copper and zinc (brass), an alloy of silver and copper, or an alloy of silver and aluminum. The radiating element 73 may be a thin film. The shape of the radiating element 73 may be rectangular or circular, but is not limited to these shapes.

Examples of another material for forming the radiating element 73 include fluorine-doped tin oxide (FTO) and indium tin oxide (ITO).

The above-described ceramic layer can be formed on the first main surface of the base material 72 by printing or the like. By providing the ceramic layer, wiring (not shown) provided to the radiating element 73 can be covered and hidden, and the design is improved. In the present embodiment, the ceramic layer may not be provided on the first main surface or may be provided on a second main surface on the inner side of the base material 72. Since the radiating element 73 and the ceramic layer can be provided on the base material 72 by printing in the same process, it is preferable that the ceramic layer is provided on the first main surface of the base material 72.

The material of the ceramic layer is glass frit or the like, and the thickness thereof is preferably 1 to 20 μm.

In the present embodiment, the radiating element 73 is provided on the first main surface of the base material 72, however, the radiating element may be provided inside the base material 72. In this case, the radiating element 73 can be provided inside the base material 72 in a coil shape, for example.

The base material 72 is, for example, a substrate provided along the outer peripheral surface of the pole. The base material 72 is formed in, for example, a rectangular shape in a plan view, and has the first main surface and the second main surface. The first main surface of the base material 72 is provided to face outward. The second main surface of the base material 72 is provided to face inward.

The material forming the base material 72 is designed according to antenna performance such as power and directivity required for the radiating element 73, and for example, a dielectric such as glass or resin, metal, or a composite thereof can be used.

When a resin is used as the base material 72, the resin is preferably a transparent resin, and examples thereof include polyethylene terephthalate, polyethylene, liquid crystal polymer (LCP), polyimide (PI), polyphenylene ether (PPE), polycarbonate, acrylic resin, and fluororesin. Fluororesin is preferable in terms of a low dielectric constant.

Examples of the fluororesin include ethylene-tetrafluoroethylene copolymer (hereinafter, also referred to as "ETFE")), hexafluoropropylene-tetrafluoroethylene copolymer (hereinafter also referred to as "FEP"), tetrafluoroethylene-propylene copolymer, tetrafluoroethylene-hexafluoropropylene-propylene copolymer, perfluoro (alkyl vinyl ether)-tetrafluoroethylene copolymer (hereinafter, also referred to as "PFA")), tetrafluoroethylene-hexafluoropropylene-vinylidene fluoride copolymer (hereinafter also referred to as "THV")), polyvinylidene fluoride (hereinafter also referred to as "PVDF")), vinylidene fluoride-hexafluoropropylene copolymers, polyvinyl fluoride, chlorotrifluoroethylene polymers, ethylene-chlorotrifluoroethylene copolymers (hereinafter also referred to as "ECTFE") and polytetrafluoroethylene. Any one of these may be used alone, or two or more thereof may be used in combination.

As the fluororesin, at least one selected from the group consisting of ETFE, FEP, PFA, PVDF, ECTFE and THV is preferable, and ETFE is particularly preferable from the viewpoint of excellent transparency, processability and weather resistance.

Aflex (registered trademark) may be used as the fluororesin.

A thinness h of the base material 72 is preferably 25 μm to 10 mm. The thickness h of the base material 72 can be arbitrarily designed depending on the location where the radiating element 73 is disposed.

When the base material 72 is a resin, it is preferable to use a resin molded into a film or sheet shape. The thickness h of the film or sheet is preferably 25 μm to 1000 μm, more preferably 100 μm to 800 μm, and most preferably 100 μm to 500 μm, from the viewpoint of excellent strength of holding the antenna.

The surface resistivity of the conductor 75 is preferably equal to or less than 20Ω/□ (ohms per square), more preferably equal to or less than 10Ω/□, and still more preferably equal to or less than 5Ω/□. The conductor 75 is preferably wider than the substrate 72, but may be narrower than the substrate 72.

The thicknesses of the conductors 75 are preferably equal to or less than 400 nm and more preferably equal to or less than 300 nm. The lower limit of the thicknesses of the conductors 75 is not particularly limited, but may be more than or equal to 2 nm, more than or equal to 10 nm, or more than or equal to 30 nm.

The radiating element 73 is a patch element (patch antenna), but may be another element such as a dipole element (dipole antenna).

Since the other antenna units such as the second antenna unit 12 may have the same shape as that of the first antenna unit 11, the description of the shape of the other antenna units is omitted by referring to the description of the shape of the first antenna unit 11.

Next, an example of a result of calculating throughput based on a simulation will be described.

TABLE 1

| Parameter | | Setting values |
|---|---|---|
| Base station | Antenna type | Pole antenna |
| | Antenna arrangement | Distributed type (three points at interval of 20 m, 40 m, 60 m) |
| | Height | 3 m, 5 m, 7 m, 10 m |
| Terminal | Antenna type | Isotropic vertical polarization |
| | Terminal arrangement | 1 mesh |
| | | *Antennas are placed at 3 locations with an interval of λ/2 from the center of mesh (vertically polarized antenna is placed in one location) |
| | Height | 1 m |
| Antenna configuration | | 3 × 3 MMO (vertical polarization only) |
| Total transmission power | | 28.8 dBm (24 dBm/layer) |
| Bandwidth | | 200 MHZ |
| NF | | 9 dB |
| Tilt angle (depression angle) | | 5°, 10° |
| Beam forming | | None |
| Path analysis | | Ray-Launching method (6 reflections, 1 diffraction) |
| Electrical constant of concrete | | ITU-R (relative dielectric constant: 5.31, conductivity: 0.4838) |
| Base station frequency | | 28 GHz |

Figure 14:
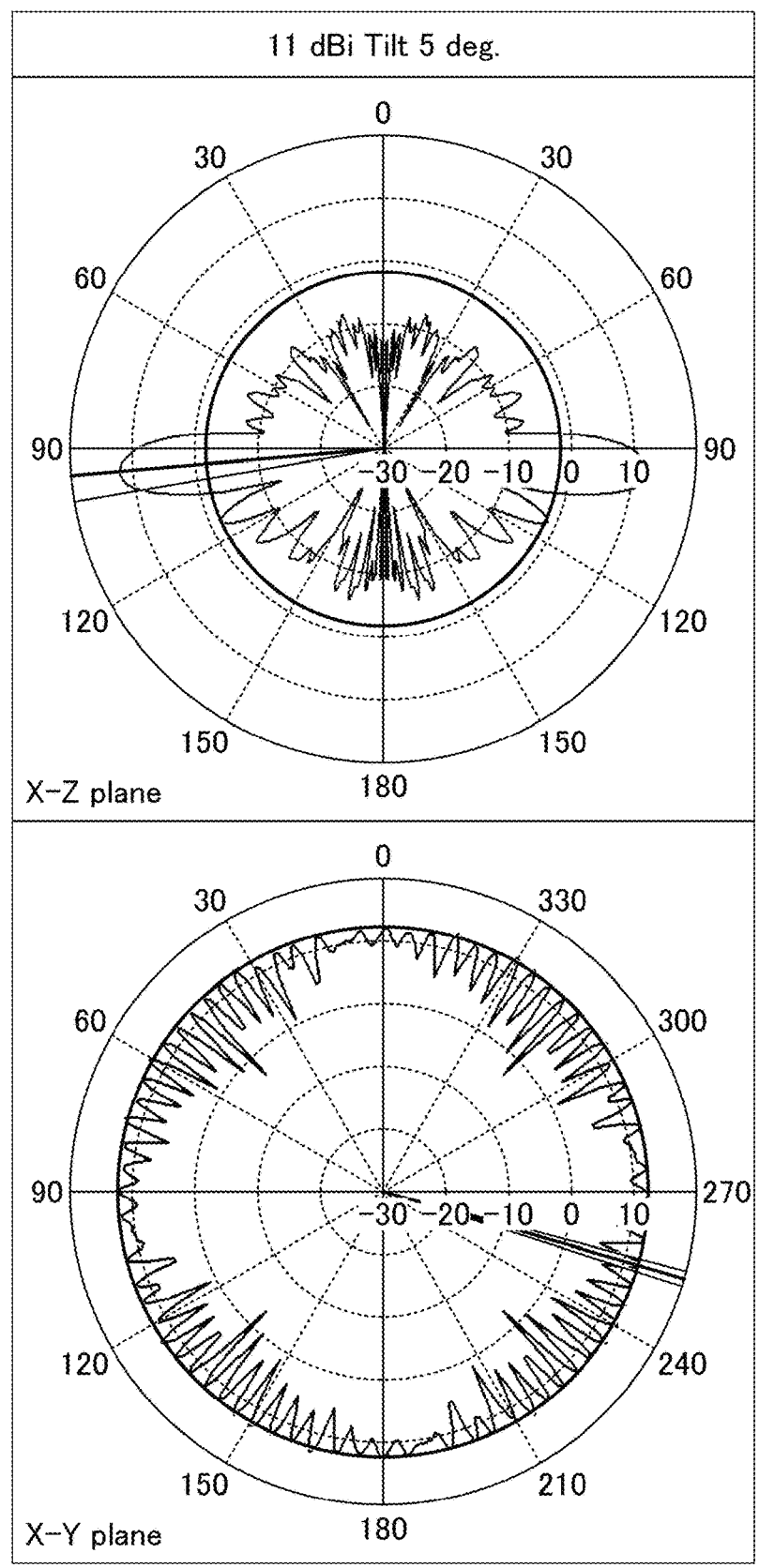
FIG. 14 is a diagram illustrating an example of the directivity of the antenna unit in the vertical plane (X-Z plane) at an azimuth angle of 0° and in the X-Y plane, in a case of radiating a 11 dBi beam at a tilt angle of 5° with respect to the X-Y plane.
Figure 15:
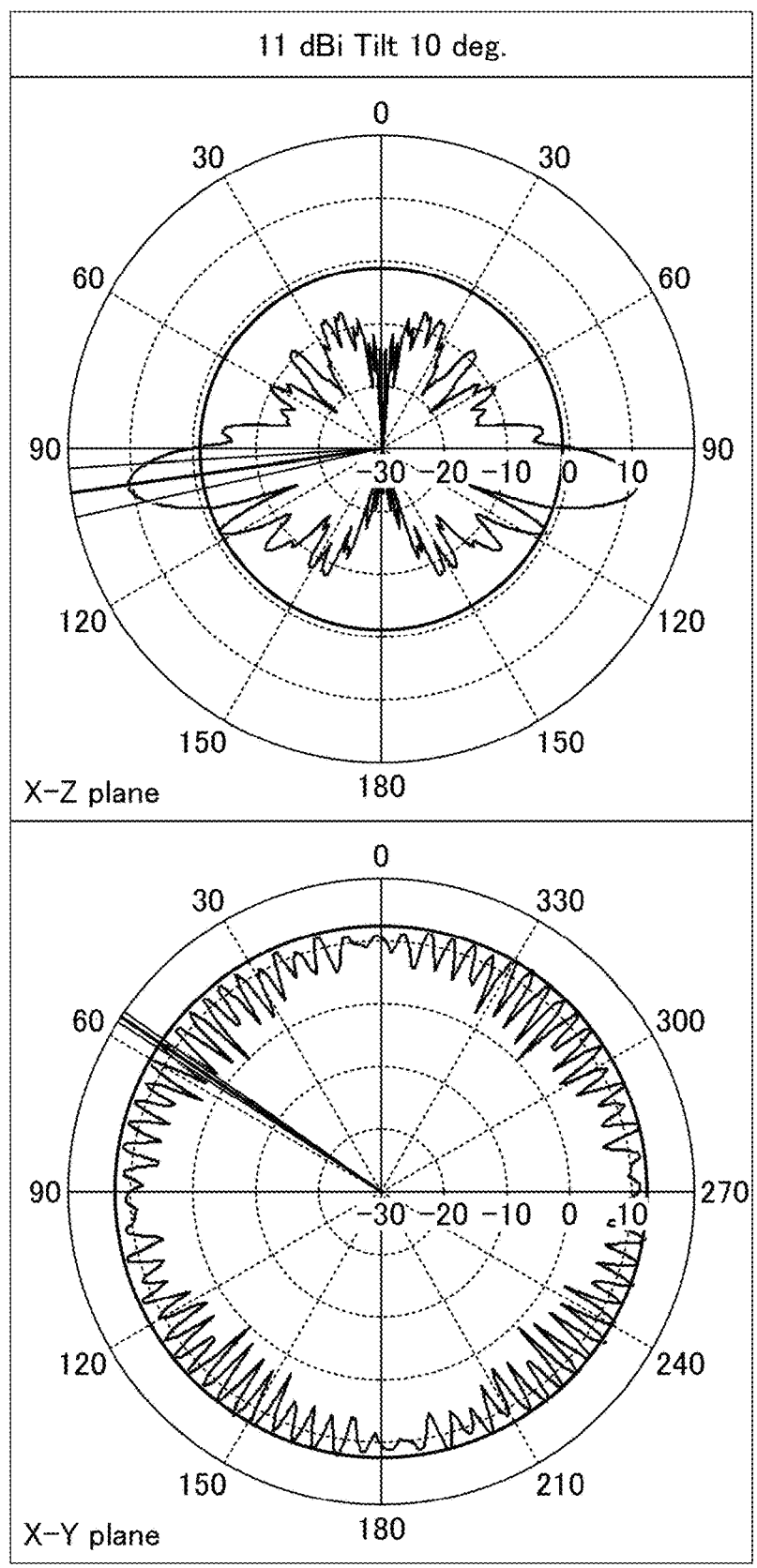
FIG. 15 is a diagram illustrating an example of the directivity of the antenna unit in the vertical plane (X-Z plane) at an azimuth angle of 0° and in the X-Y plane, in a case of radiating a 11 dBi beam at a tilt angle of 10° with respect to the X-Y plane.
Figure 16:
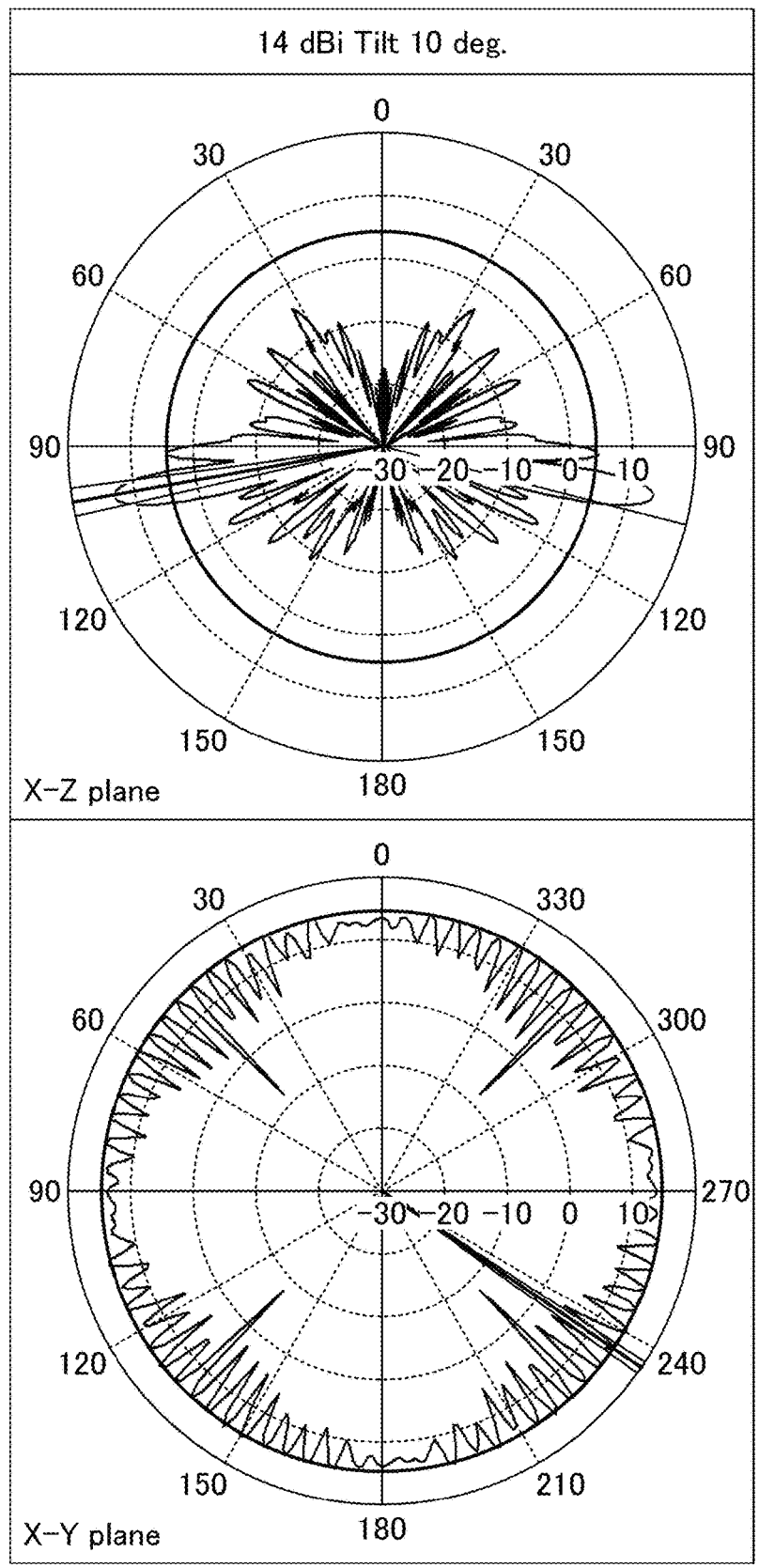
FIG. 16 is a diagram illustrating an example of the directivity of the antenna unit in the vertical plane (X-Z plane) at an azimuth angle of 0° and in the X-Y plane, in the case of radiating a 14 dBi beam at a tilt angle of 10° with respect to the X-Y plane.

Table 1 shows simulation conditions when calculating the throughput based on the simulation. FIGS. 14, 15, and 16 show radiation patterns of a plurality of antenna units used in the simulation. The radiation patterns of the plurality of antenna units used in the simulation are all the same.

FIG. 14 is a diagram illustrating an example of the directivity of the antenna unit in the vertical plane (X-Z plane) at an azimuth angle of 0° and in the X-Y plane, in the case of radiating a 11 dBi beam at a tilt angle of 5° with respect to the X-Y plane. FIG. 15 is a diagram illustrating an example of the directivity of the antenna unit in a vertical plane (X-Z plane) at an azimuth angle of 0° and in the X-Y plane in the case of radiating a 11 dBi beam at a tilt angle of 10° with respect to the X-Y plane. FIG. 16 is a diagram illustrating an example of the directivity of the antenna unit in a vertical plane (X-Z plane) at an azimuth angle of 0° and in the X-Y plane in the case of radiating a 14 dBi beam at a tilt angle of 10° with respect to the X-Y plane. In the examples, the gain 11 dBi corresponds to the half-width of 10°, and the gain 14 dBi corresponds to the half-width of 5°.

Figure 17:
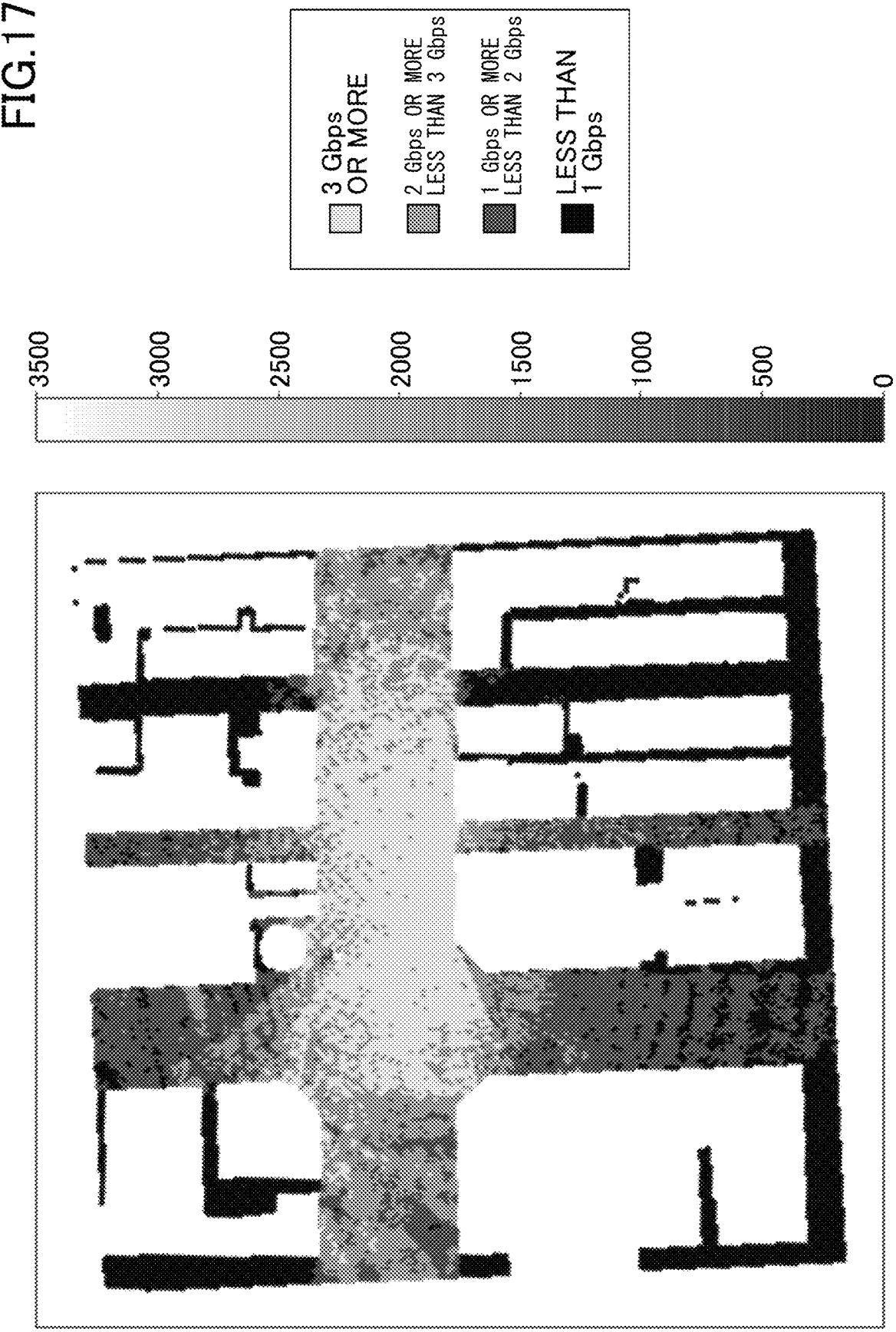
FIG. 17 is a distribution diagram illustrating an example of throughput obtained when three antenna units having the characteristics of FIG. 14 are arranged at 20 m intervals.
Figure 18:
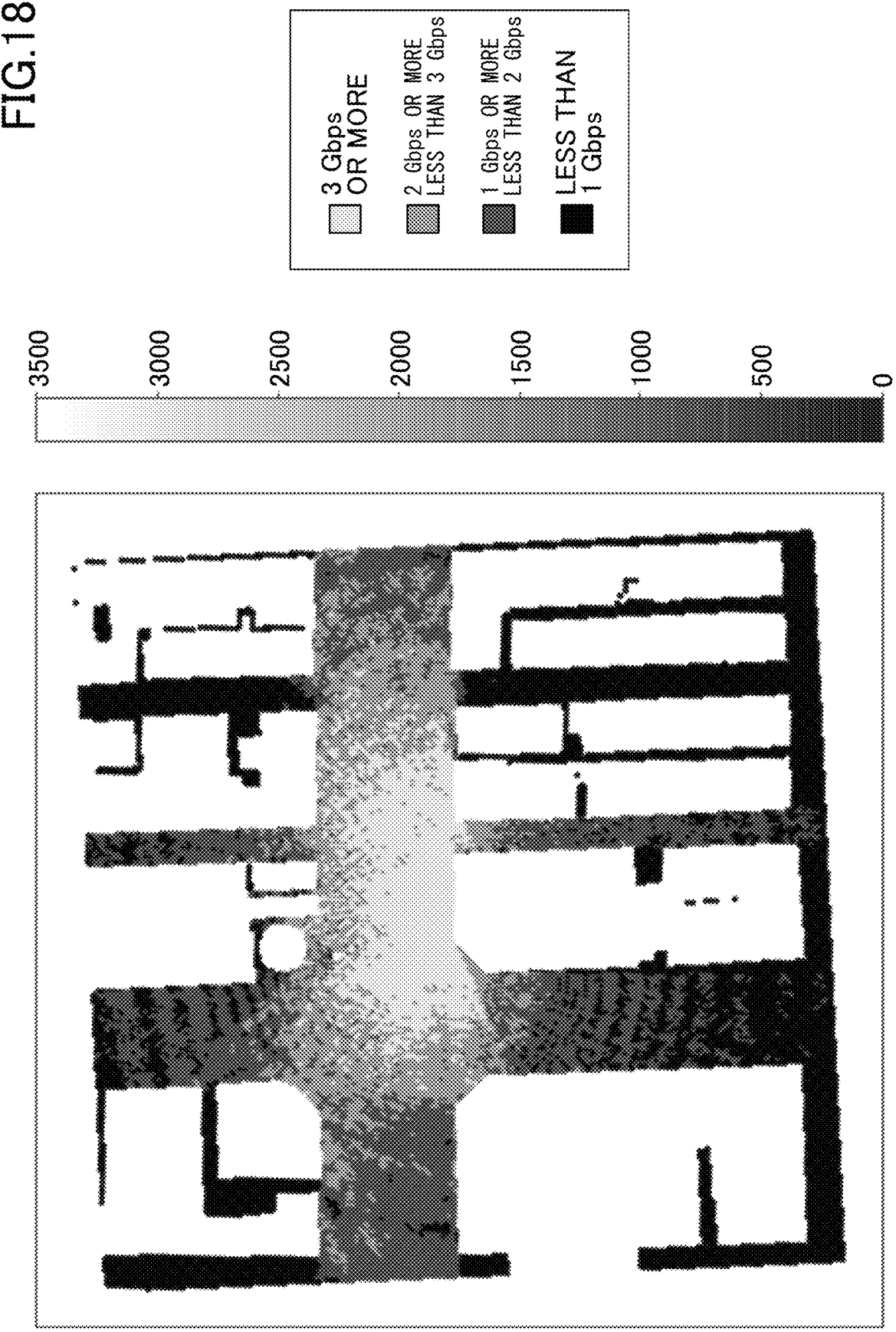
FIG. 18 is a distribution diagram illustrating an example of throughput obtained when three antenna units having the characteristics of FIG. 15 are arranged at 20 m intervals.
Figure 19:
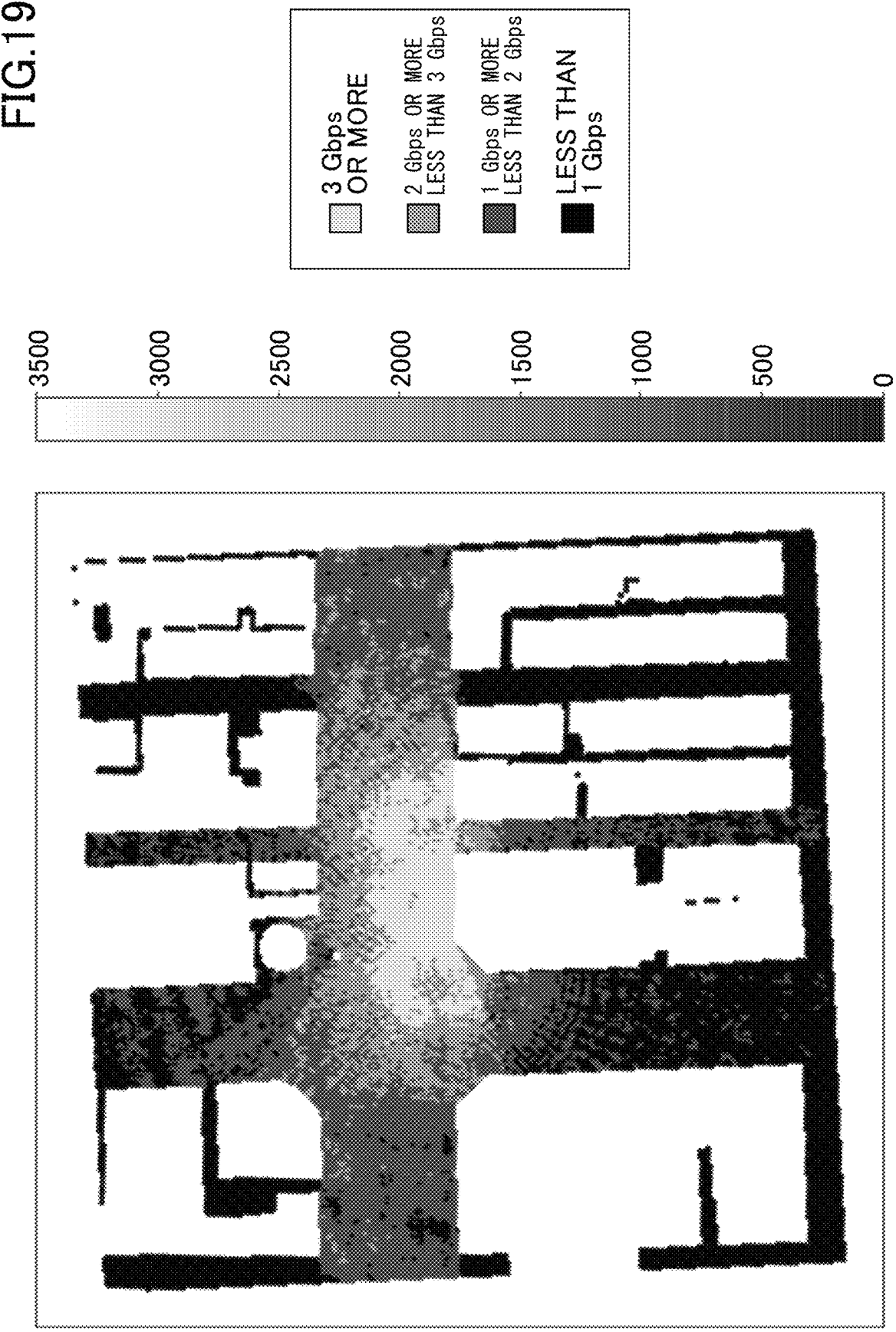
FIG. 19 is a distribution diagram illustrating an example of throughput obtained when three antenna units having the characteristics of FIG. 16 are arranged at 20 m intervals.
Figure 20:
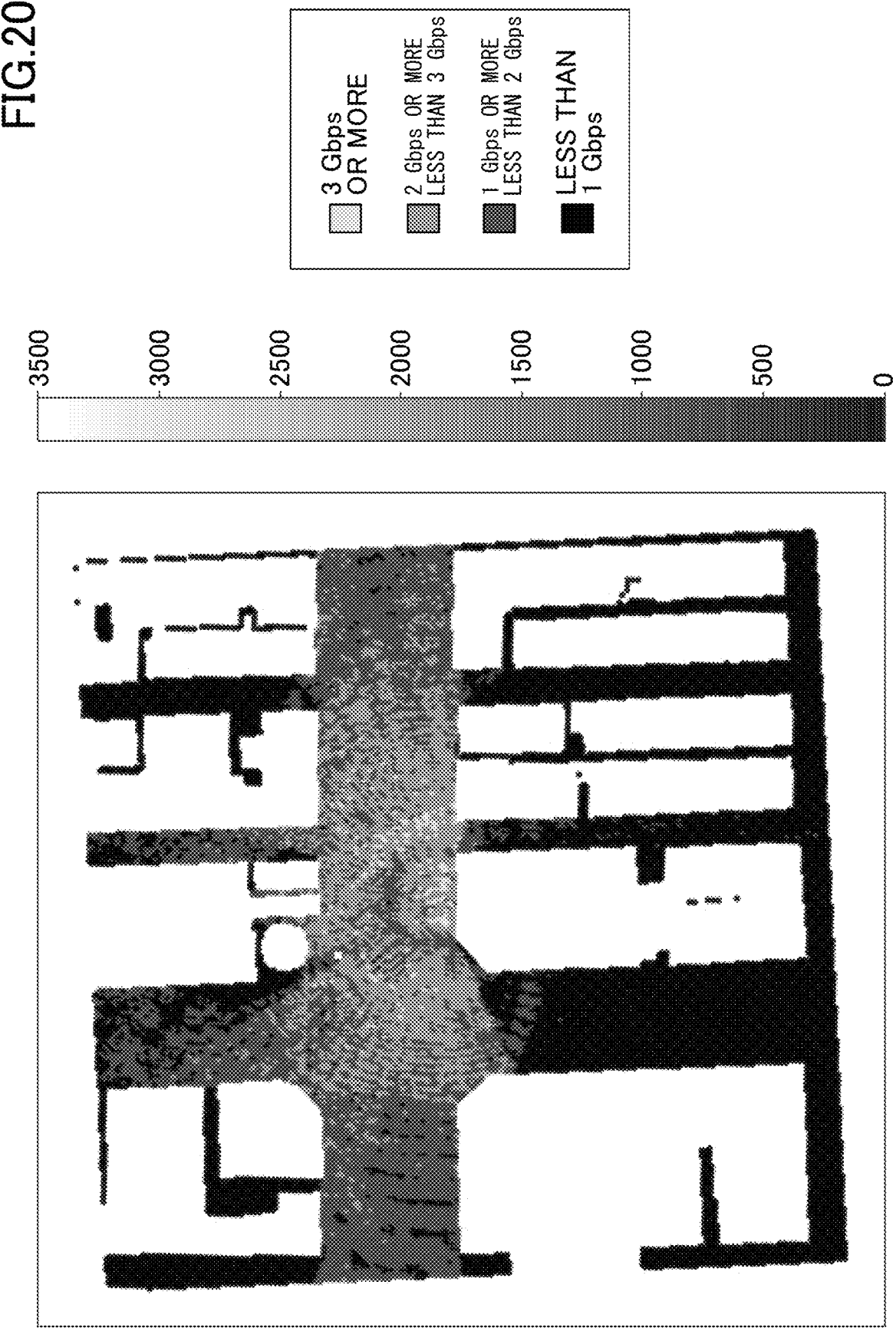
FIG. 20 is a distribution diagram illustrating an example of throughput obtained when three antenna units having the characteristics of FIG. 14 are arranged in the concentrated manner at the same place.

FIG. 17 is a distribution diagram showing an example of throughput obtained when three antenna units having the characteristics of FIG. 14 are arranged at 20 m intervals. FIG. 18 is a distribution diagram showing an example of throughput obtained when three antenna units having the characteristics of FIG. 15 are arranged at 20 m intervals. FIG. 19 is a distribution diagram showing an example of throughput obtained when three antenna units having the characteristics of FIG. 16 are arranged at 20 m intervals. FIG. 20 is a distribution diagram showing an example of throughput obtained when three antenna units having the characteristics shown in FIG. 14 are arranged in a concentrated manner at the same place.

According to FIGS. 17 to 20, there was obtained a result that the distributed arrangement type (FIGS. 17 to 19) can form a communication area where high throughput can be obtained as compared with the concentrated arrangement type (FIG. 20).

Although the antenna set has been described above with reference to the embodiment, the present disclosure is not limited to the embodiment. Various modifications and improvements such as combinations or replacements with some or all the other embodiments are possible within the scope of the present disclosure.

The structure on which the antenna unit is installed is not limited to the pole. The antenna unit may be installed in a structure built on a ground, such as a power pole, a utility pole, a street light, a traffic light, a sign, or a building.

Also, the antenna set may include two, four, or more of antenna units that transmit streams in distributed-MIMO. When four or more antenna units are provided, a communication area where higher throughput can be obtained can be formed. In addition, the number of people accommodated in the communication area can be increased.

What is claimed is:

1. A Base Station (BS) antenna set comprising an antenna unit group for transmitting streams in distributed-MIMO,
    wherein the antenna unit group includes a plurality of antenna units arranged apart from each other, and
    wherein the plurality of antenna units is installed at a height between 3 m and 8 m, inclusive, with a non-directional angle of a radiation pattern in a horizontal plane being more than or equal to 180°, and a radiation peak of a main lobe is inclined at a depression angle of greater than 0° and less than or equal to 15°,
    wherein when an average value of depression angles for the plurality of antenna units is a [°], an average value of installation heights for the plurality of antenna units is b [m], an average value of half-widths for main lobes radiated from the plurality of antenna units is c [°], and an average value of intervals between adjacent antenna units included in the plurality of antenna units is d [m], following equations are satisfied:

$PC1=-(a/10.6)-(b/10.8)+(c/5.7)+(d/19.8)-1.8$ $PC2=(a/12.0)+(b/2.5)+(c/6.6)+(d/99.6)-4.9$ $PC2 \geq -4.5 \times PC1-4.5$ $PC2 \leq 0.15 \times PC1+1.0$, and wherein the plurality of antenna units is installed at a height between 3.5 m and 7.5 m, inclusive, the radiation peak of the main lobe is inclined at a depression angle between 1.0° and 14°, inclusive, and the plurality of antenna units includes two antenna units adjacent to each other, and an interval therebetween is between 20 m and 70 m, inclusive.

2. The Base Station (BS) antenna set according to claim 1, wherein each of the plurality of antenna units has a half-width of the main lobe of between 6° and 15°, inclusive.

3. The Base Station (BS) antenna set according to claim 1, wherein each of the plurality of antenna units has 360° omnidirectional directivity of radiation pattern in the horizontal plane.

4. The Base Station (BS) antenna set according to claim 1, wherein, at a location where a direct wave reception level of a radio wave transmitted from one antenna unit included in the antenna unit group is maximized, "a reflected wave reception level of the radio wave [dB]+the direct wave reception level of the radio wave [dB]" is between 0.7 and 0.95, inclusive.

5. The Base Station (BS) antenna set according to claim 1, further comprising a reflector that reflects a radio wave between adjacent antenna units included in the plurality of antenna units.

6. The Base Station (BS) antenna set according to claim 1,
wherein the antenna unit group includes a first antenna unit and a second antenna unit adjacent thereto, and
wherein when, viewed in a direction perpendicular to the horizontal plane, a length of a line segment connecting the first antenna unit and the second antenna unit is d, a point extending the line segment from the first antenna unit by 0.5×d is p1, a point extending the line segment from the second antenna unit by 0.5×d is p2, a straight line passing through p1 and p2 is L1, a straight line passing through the point p1 and perpendicular to the straight line L1 is L2, a straight line passing through the point p2 and perpendicular to the straight line L1 is L3, a straight line parallel to the straight line L1 and farthest therefrom within a range not intersecting with an obstacle preventing propagation of radio waves is L4, and a rectangular area surrounded by the straight lines L1, L2, L3, and L4 is S, the first antenna unit and the second antenna unit are arranged such that a proportion of an area where throughput greater than or equal to 1 Gbps is obtained in the rectangular area S is greater than or equal to 90%.

7. The Base Station (BS) antenna set according to claim 1, wherein the antenna units are installed on one or more structures built on a ground.

8. The Base Station (BS) antenna set according to claim 7, wherein the one or more structures are a power pole, a utility pole, a street light, a traffic light, a sign, or a building.

9. The Base Station (BS) antenna set according to claim 1, wherein the antenna does not include beam forming.

* * * * *